US011501291B2

(12) United States Patent
McCauley et al.

(10) Patent No.: US 11,501,291 B2
(45) Date of Patent: Nov. 15, 2022

(54) CRYPTOASSET CUSTODIAL SYSTEM USING ENCRYPTED AND DISTRIBUTED CLIENT KEYS

(71) Applicant: Anchor Labs, Inc., San Francisco, CA (US)

(72) Inventors: Nathan P. McCauley, San Francisco, CA (US); Diogo Monica, San Francisco, CA (US); Boaz Avital, San Francisco, CA (US); Riyaz D. Faizullabhoy, Los Altos, CA (US)

(73) Assignee: Anchor Labs, Inc., San Francisco, CA (US)

( * ) Notice: Subject to any disclaimer, the term of this patent is extended or adjusted under 35 U.S.C. 154(b) by 326 days.

(21) Appl. No.: 16/572,375

(22) Filed: Sep. 16, 2019

(65) Prior Publication Data
US 2021/0056539 A1 Feb. 25, 2021

Related U.S. Application Data

(60) Provisional application No. 62/891,252, filed on Aug. 23, 2019.

(51) Int. Cl.
*G06Q 20/36* (2012.01)
*G06Q 20/38* (2012.01)
(Continued)

(52) U.S. Cl.
CPC ..... *G06Q 20/3674* (2013.01); *G06Q 20/0658* (2013.01); *G06Q 20/3829* (2013.01); *H04L 9/0637* (2013.01)

(58) Field of Classification Search
CPC .......... G06Q 20/3674; G06Q 20/3829; G06Q 20/0658; G06Q 20/02; G06Q 20/065;
(Continued)

(56) References Cited

U.S. PATENT DOCUMENTS 6,950,523 B1 9/2005 Brickell et al.
8,385,553 B1 * 2/2013 Jooste ................... H04W 12/35
713/193
(Continued)

FOREIGN PATENT DOCUMENTS

WO WO 2019/168792 9/2019

OTHER PUBLICATIONS

Anonymous: "CASP Solution Overview, "and "Installing Casp" Mar. 2019, retrieved from the Internet: URL: https://www.unboundtech.com/docs/CASP/Versions/1.0.1902/CASPUserGuideHTML/Content/Products/CASP/CASP_Offering_Description/Solution.htm#h2 10, 5 pages.

(Continued)

*Primary Examiner* — Neha Patel
*Assistant Examiner* — Chunling Ding
(74) *Attorney, Agent, or Firm* — Bookoff McAndrews, PLLC

(57) ABSTRACT

A hardware security module (HSM) generates a client key for an account holder of a cryptoasset custodial system. The HSM encrypts the client key to generate an encrypted client key using a hardware-based cryptographic key within a secure storage device. The encrypted client key is transmitted to client devices. The HSM deletes the encrypted client key from the secure storage device. Each client device stores the encrypted client key in an offline secure enclave. A request to authorize a cryptoasset transaction is received. The HSM determines that signed messages endorsing the cryptoasset transaction have been received from at least some client devices in satisfaction of a quorum. The encrypted client key is received from at least one client device. The HSM decrypts the encrypted client key. The HSM signs an approval message for the cryptoasset trans-
(Continued)

action using a cryptoasset key based at least in part on the client key.

20 Claims, 10 Drawing Sheets

(51) Int. Cl.
*G06Q 20/06* (2012.01)
*H04L 9/06* (2006.01)

(58) Field of Classification Search
CPC ............ G06Q 20/223; G06Q 20/3678; G06Q 20/3827; G06Q 20/389; G06Q 20/401; G06Q 20/4016; H04L 9/0637; H04L 2209/56; H04L 9/0877; H04L 9/0897; H04L 9/3255; H04L 2209/38; H04L 9/3239; H04L 9/50
See application file for complete search history.

(56) References Cited

U.S. PATENT DOCUMENTS

| | | | |
|---|---|---|---|
| 9,608,813 B1* | 3/2017 | Roth | H04L 9/0825 |
| 9,892,460 B1* | 2/2018 | Winklevoss | G06Q 40/04 |
| 9,916,581 B2 | 3/2018 | Dorsey et al. | |
| 10,068,228 B1* | 9/2018 | Winklevoss | H04L 9/3239 |
| 10,373,158 B1 | 8/2019 | James et al. | |
| 10,439,811 B2 | 10/2019 | Norton | |
| 2004/0128504 A1 | 7/2004 | Kivinen | |
| 2004/0236694 A1 | 11/2004 | Tattan | |
| 2005/0273442 A1 | 12/2005 | Bennett | |
| 2008/0031460 A1 | 2/2008 | Brookner et al. | |
| 2010/0024017 A1 | 1/2010 | Ashfield et al. | |
| 2010/0119061 A1 | 5/2010 | Kawale | |
| 2011/0154025 A1 | 6/2011 | Spalka | |
| 2012/0192260 A1 | 7/2012 | Kontsevich | |
| 2014/0046842 A1 | 2/2014 | Irudayam | |
| 2014/0156534 A1 | 6/2014 | Quigley et al. | |
| 2015/0088754 A1* | 3/2015 | Kirsch | G06Q 20/401 713/171 |
| 2015/0170112 A1 | 6/2015 | DeCastro | |
| 2015/0287026 A1* | 10/2015 | Yang | G06Q 20/3678 705/69 |
| 2015/0324764 A1* | 11/2015 | Van Rooyen | G06Q 20/0655 705/69 |
| 2015/0373122 A1 | 12/2015 | Steel et al. | |
| 2016/0189134 A1* | 6/2016 | Voege | G06F 21/35 705/44 |
| 2016/0283920 A1 | 9/2016 | Fisher et al. | |
| 2016/0285872 A1 | 9/2016 | Polar | |
| 2017/0006018 A1* | 1/2017 | Campagna | H04L 9/088 |
| 2017/0154331 A1 | 6/2017 | Voorhees | |
| 2017/0230375 A1 | 8/2017 | Kurian | |
| 2017/0373849 A1 | 12/2017 | Donner et al. | |
| 2017/0374033 A1 | 12/2017 | Kovacs | |
| 2018/0004930 A1* | 1/2018 | Csinger | H04L 63/0853 |
| 2018/0130158 A1 | 5/2018 | Atkinson et al. | |
| 2018/0181737 A1 | 6/2018 | Tussy | |
| 2018/0367311 A1 | 12/2018 | Stahlberg | |
| 2018/0367316 A1 | 12/2018 | Cheng et al. | |
| 2019/0043022 A1 | 2/2019 | Fosmark et al. | |
| 2019/0207915 A1 | 7/2019 | Schaap | |
| 2019/0236594 A1 | 8/2019 | Ehrloch-Quinn et al. | |
| 2019/0251524 A1 | 8/2019 | Sadrizadeh et al. | |
| 2019/0266576 A1 | 8/2019 | McCauley et al. | |
| 2019/0268165 A1 | 8/2019 | Monica et al. | |
| 2019/0305956 A1 | 10/2019 | Irani, III | |
| 2019/0347666 A1 | 11/2019 | Bermudez-Cisneros et al. | |
| 2019/0356491 A1 | 11/2019 | Herder, III et al. | |
| 2019/0372779 A1 | 12/2019 | Monica et al. | |
| 2020/0167338 A1 | 5/2020 | Brock et al. | |
| 2020/0169401 A1* | 5/2020 | Dooley | H04L 63/062 |
| 2020/0266997 A1 | 8/2020 | Monica et al. | |
| 2020/0320188 A1* | 10/2020 | Graff | H04L 63/0861 |
| 2020/0380523 A1 | 12/2020 | Agrawal et al. | |

OTHER PUBLICATIONS

PCT International Search Report and Written Opinion in International Appln. No. PCT/US2020/043882, dated Nov. 2, 2020, 12 pages.
PCT International Search Report and Written Opinion in International Appln. No. PCT/US2020/045737, dated Nov. 11, 2020, 12 pages.
Sato et al., "General Security Considerations for Cryptoassets Custodians draft-vcgtf-crypto-assets-security-considerations-04," Apr. 2019, retrieved from the Internet: URL:https://tools.ietf.org/html/draft-vcgtf-crypto-assets-security-considerations-04. 47 pages.
U.S. Appl. No. 16/276,567, filed Feb. 14, 2019, Monica et al.
Anonymous: "Hierarchical Deterministic: Wallets—BIP32", Feb. 2017, Retrieved from the Internet: URL:https://github.com/bitcoin/bips/blob(11b0fa37bee4eac40c3a1be059107868$bcc3392/bip-0032.mediawiki [retrieved on Jun. 20, 2018].
Anonymous: "How to properly secure cryptocurrencies exchanges—Ledger", Aug. 2016, Retrieved from the Internet: URL:https://www.ledger.fr/2016/08/08/hcpw-to-properly-secure-cryptocurrencies-exchanges/ [retrieved on Jun. 29, 2018].
bisontrails.co [online] "Bison Trails is the easiest way to run infrastructure on multiple blockchains," Retrieved on Jul. 31, 2019, Retrieved from URL <https://bisontrails.co/?gclid=EAIaIQobChMItuuNvOuU5QIVB6vsCh11vQvyEAAYASAAEgIw3vD_BwE>, 6 pages.
Cryptomathic.com [online], "Understanding Hardware Security Modules," Sep. 13, 2017, retrieved on Dec. 31, 2018, retrieved from: URL<https:www.cryptomathic.com/news-events/blog/understanding-hardware-security-modules-hsms>, 10 pages.
International Search Report and Written Opinion in Application No. PCT/US2019/019414, dated May 15, 2019, 12 pages.
International Search Report and Written Opinion in Application No. PCT/US2019/019425, dated May 9, 2019, 12 pages.
Monica, "Crypto Anchors: Exfiltration Resistant Infrastructure," 11 pages, dated Oct. 8, 2017.
Monica, "Increasing Attacker Cost Using Immutable Infrastructure," 8 pages, dated Nov. 19, 2016.
Monica, "The two metrics that matter for host security," 6 pages, dated Aug. 31, 2017.
Wired.com [online], "Crypto anchors might stop the next Equifax-style megabreach," Oct. 11, 2017, retrieved from: URLhttps://www.wired.com/story/crypto-anchors-breach-security/>, 11 pages.
Bonneau et al., "SoK: Research Perspectives and Challenges for Bitcoin and Cryptocurreneies," 2015 IEEE Symposium on Security and Privacy, May 17-21, 2015, San Jose, CA, USA, 104-121.
Liu et al., "Security Analysis of Electronic Payment Protocols Based on Quantum Cryptography," 2017 4th International Conference on Information Science and Control Engineering, Jul. 21-23, 2017, Changsha, China, 1709-1712.
PCT International Search Report and Written Opinion in International Appln. No. PCT/US2020/017411, dated Apr. 15, 2020, 19 pages.

\* cited by examiner

CRYPTOASSET CUSTODIAL SYSTEM USING ENCRYPTED AND DISTRIBUTED CLIENT KEYS

CROSS-REFERENCE TO RELATED APPLICATIONS

This application claims the benefit of U.S. Patent Application No. 62/891,252, filed Aug. 23, 2019, which is incorporated by reference herein.

TECHNICAL FIELD

This description relates generally to a cryptoasset custodial system using encrypted and distributed client keys.

BACKGROUND

A blockchain is a distributed ledger technology that enables multiple users to produce and share a verifiable record of every transaction made in a system that uses the blockchain. Blockchains can be public, private, or include both publicly and privately accessible portions. A blockchain is updated by consensus among designated users of the system. Thus, a blockchain represents a consensus of replicated, shared, and synchronized digital data spread across multiple nodes, without a central administrator or centralized data storage. Replication and sharing, in addition to the use of cryptographic hashing techniques, give the blockchain-based distributed ledger its characteristic resiliency and protection against unauthorized alteration. However, the lack of a central administrator can also result in new risks when access keys for the blockchain are lost or stolen. This can be of particular concern when the blockchain includes large amounts of cryptographic assets, also referred to as cryptoassets, such as Bitcoin, Ethereum, and Ripple cryptocurrencies.

Such cryptocurrencies have gained in popularity and value in recent years and are expected by many to continue to do so. Every day an increasing variety of transactions are conducted based on cryptocurrencies, and it is conceivable that new types of cryptoassets may be created in the future, i.e., cryptoassets that are not necessarily currencies. With the increasing use of cryptoassets comes the need for a trusted custodial system that can securely store very large quantities of cryptoassets and control access to those cryptoassets. Indeed, U.S. securities regulations require certain entities that hold more than a certain amount of funds (e.g., $150 million) on behalf of another party to use a custodian to hold those funds. Hardware wallets and other forms of "cold storage" devices are sometimes used to store cryptocurrency, however, those devices limit access only to the owner of the device and are therefore not suitable for many business uses, where a number of individuals may require access to cryptocurrencies or other cryptoassets.

SUMMARY

This specification describes a cryptoasset custodial system (sometimes referred to as a "CCS") using encrypted and distributed client keys. Methods, systems, and apparatus for implementing the cryptoasset custodial system include using a hardware security module of the cryptoasset custodial system to generate a client key for an account holder of the cryptoasset custodial system. The client key is an account-holder-specific, asset-agnostic, cryptographic key. If certain conditions are met, the cryptoasset custodial system can use the client key, or a cryptoasset key derived from the client key, to authorize a cryptoasset transaction. The client key can sometimes be referred to as a "client seed" or a "master seed." The hardware security module encrypts the client key to generate an encrypted client key using a hardware-based cryptographic key within a secure storage device of the hardware security module. An online server computer of the cryptoasset custodial system can transmit the encrypted client key to the client devices of the account holder. The online server computer is communicably coupled to the hardware security module via a relay server. The hardware security module can delete the encrypted client key from the secure storage device after the encrypted client key is transmitted to the client devices of the account holder.

Each client device of the plurality of client devices can store the encrypted client key, e.g., in an offline secure enclave of each client device. In one implementation, the copies of the encrypted client key are exclusively stored on the client devices and not on a cloud or on the hardware security module. Thus the encrypted client key is stored in a distributed manner. The embodiments disclosed herein provide security advantages since a malicious entity must compromise both a client device as well as the hardware security module to gain access to the client key. Moreover, the copies of the encrypted client key stored on the different client devices provide redundancy and security advantages (encrypted client keys are inherently backed up on multiple client devices).

The cryptoasset custodial system can receive a request, e.g., from a representative of the account holder, to authorize a cryptoasset transaction. The hardware security module can determine that signed messages endorsing the cryptoasset transaction have been received from at least some of the client devices in satisfaction of a quorum, e.g., a quorum that was previously specified as being necessary for endorsing the cryptoasset transaction. The online server computer receives the encrypted client key from at least one client device. The hardware security module decrypts the encrypted client key to generate the client key. The decrypting is performed using the hardware-based cryptographic key of the hardware security module. The hardware security module signs an approval message for the cryptoasset transaction using a cryptoasset key based at least in part on the client key to produce a digitally signed approval message. The online server computer forwards the digitally signed approval message, provided by the hardware security module, to a blockchain.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
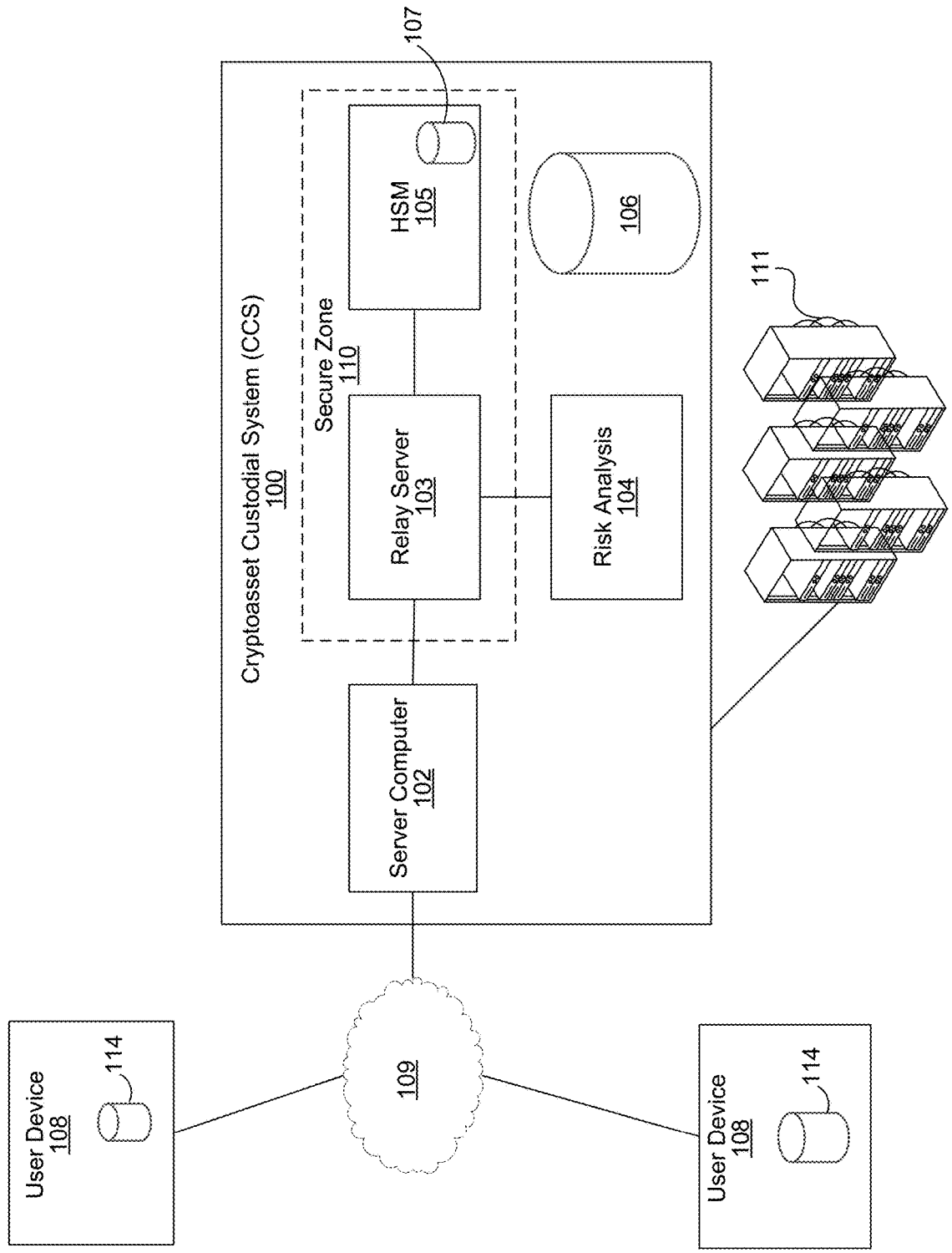
FIG. 1 illustrates an example block diagram of a cryptoasset custodial system.

In the following description, for the purposes of explanation, numerous specific details are set forth in order to provide a thorough understanding of the disclosed embodiments. It will be apparent, however, that the embodiments may be practiced without these specific details.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

FIG. 1 illustrates an example block diagram of a cryptoasset custodial system 100. The cryptoasset custodial system 100 is a computer-implemented system for maintaining custody of, and controlling access to, cryptocurrencies and/or other cryptoassets. The cryptoasset custodial system 100 may be owned and/or operated by a business enterprise, referred to herein as the Cryptoasset Custodian. The cryptoasset custodial system 100 includes multiple layers of security so as to enable large volumes of cryptoassets to be maintained in a secure manner. In certain embodiments the cryptoasset custodial system 100 includes a combination of biometric-based multi-user validation, transaction risk analysis, and use of a hardware security module 105 to provide authentication/validation functionality and secure storage of private keys of cryptoassets. Furthermore, two or more different biometric authentication techniques may be applied to any given transaction request. As used herein, the term "hardware security module" refers to a special-purpose physical computing device that safeguards and manages digital keys for authentication and provides cryptoprocessing functionality. The hardware security module 105 can be embodied as a plug-in card or an external device that attaches directly to a computer.

In certain embodiments, when a client device 108 requests a transaction involving a cryptoasset, such as a withdrawal of transfer of cryptocurrency funds, the cryptoasset custodial system 100 causes an endorsement request message to be sent to each client device 108, each of which is associated with a different user who has been defined as potential member of a quorum for transactions involving that cryptoasset (in other embodiments, multiple users may share the same client device 108). The endorsement request message is configured to cause each receiving client device 108 to prompt its endorser/user to provide an endorsement of the requested transaction. An endorsement in this context is an approval or rejection of an operation by an endorser/user. When an endorser/user receiving such a prompt endorses the transaction on his or her client device 108 (e.g., a smartphone, tablet or notebook computer), the client device 108 signs an endorsement with a private key of that user and transmits the signed endorsement to the cryptoasset custodial system 100. The private key is stored within a secure enclave 114 within the client device 108. A secure enclave 114 in each client device 108 is used to store the corresponding user's private key and to generate digital signatures of that user.

The hardware security module 105 determines whether a policy-based quorum of users has endorsed (approved) a requested action, such as a withdrawal or transfer of cryptocurrency funds. The hardware security module 105 validates the signature by a public key of a public-private key pair for each of the plurality of users, in endorsements received from the users. In one implementation, only after determining that the policy-based quorum of users has validly endorsed the requested action, the hardware security module 105 allows itself to access or derive the private key (sometimes referred to as a "cryptoasset key") of that particular cryptographic asset (e.g., for a specific deposit of cryptocurrency funds), and uses that private key to sign the transaction as authorization that the transaction may proceed. The private key of the particular cryptographic asset may be accessed or derived using a client key and the client key can be derived from an encrypted client key stored on one or more user devices for authorized representatives of the client. The encrypted client key can be transmitted to the hardware security module 105 and the hardware security module 105 can derive the client key from the encrypted client key by decrypting the encrypted client key using the hardware-based cryptographic key stored within the secure storage device 107 of the hardware security module 105.

The hardware-based cryptographic key within the secure storage device 107 of the hardware security module 105 is stored only in the hardware security module 105, thus the hardware-based cryptographic key cannot be read by any entity outside the hardware security module 105. Approval of the transaction may include, for example, transmitting the transaction onto a known blockchain network. In certain embodiments, approval of the transaction by the hardware security module 105 occurs only if and after the requested transaction has passed a risk review, which may be partially or fully automated. The system and techniques introduced here can also be used for secure custody of other types of digital assets besides cryptoassets.

Refer now to FIG. 1, which shows a high-level block diagram of the cryptoasset custodial system 100. In the illustrated embodiment, the cryptoasset custodial system 100 includes a server computer 102, a relay server 103, a risk analysis module 104, the hardware security module 105, and a data storage facility 106. The data storage facility 106 may include one or more databases, which can be or include relational databases or any other type of mechanism for storing data in an organized way, where the data may be structured data and/or unstructured data. The hardware security module 105 also includes its own internal secure storage facility 107. Note that there can be multiple instances of each of the above-mentioned components in the cryptoasset custodial system 100, even though only one of each is shown to simplify description. One or more client devices 108, also called clients, can communicate with the cryptoasset custodial system 100 via a public computer network 109, such as the Internet. Each of the client devices 108 may be any one of, for example, a smartphone, tablet computer, laptop computer, desktop computer, or the like. Each client device 108 may include a secure enclave 14, such as an iOS-based secure enclave, which is used to store the corresponding user's private key and to generate digital signatures of that user. In at least some embodiments, each client device 108 is associated with a different user, and this description henceforth assumes such an embodiment to facilitate description. Note, however, that it is possible to have embodiments in which multiple users share the same client device 108.

In some embodiments, the relay server 103 functions as a bridge over a physical air gap to isolate the hardware security module 105 from the public computer network 109. In other embodiments, the relay server 103 functions as a virtual air gap to isolate the hardware security module 105 from the public computer network 109. The relay server 104 and hardware security module 105 operate within a secure zone 110. The hardware security module 105 may physically reside in a physically secured datacenter with no direct access to any outside network. Messages between the hardware security module 105 and the server computer 102 are routed on a half-duplex (outbound request-responses only) connection to the relay server 103 in the secure zone 110. The relay server 103 disconnects itself from the secure network while communicating with the server computer 102, and disconnects itself from all external networks while communicating with the hardware security module 105, such that no interactive sessions with those devices can be established from the outside. This provides "air gap" security to critical infrastructure.

In certain embodiments, the cryptoasset custodial system 100 also has access to at least one blockchain network 111 corresponding to a cryptoassets of which the cryptoasset custodial system 100 has custody. Access to the blockchain network 111 may be via the public computer network 109, e.g., the Internet.

In some embodiments, each transaction submitted by a customer of the cryptoasset custodial system 100 will go through the risk analysis module 104, which may be partially or fully automated. For example, with some embodiments of the cryptoasset custodial system 100, a human risk analysis agent may evaluate the output of automated risk analysis software displayed on a risk review dashboard, to make a decision on whether a transaction has been sufficiently authorized to be accepted. The risk analysis agent or the software can follow a policy set on each individual vault and can look at any of various risk signals (e.g., the amount being transacted, how many users have authorized this transaction, the location(s) from which the transaction was requested and approved, the destination address) to compute a final risk metric that might lead to the transaction being approved or more information being requested.

Figure 2A:
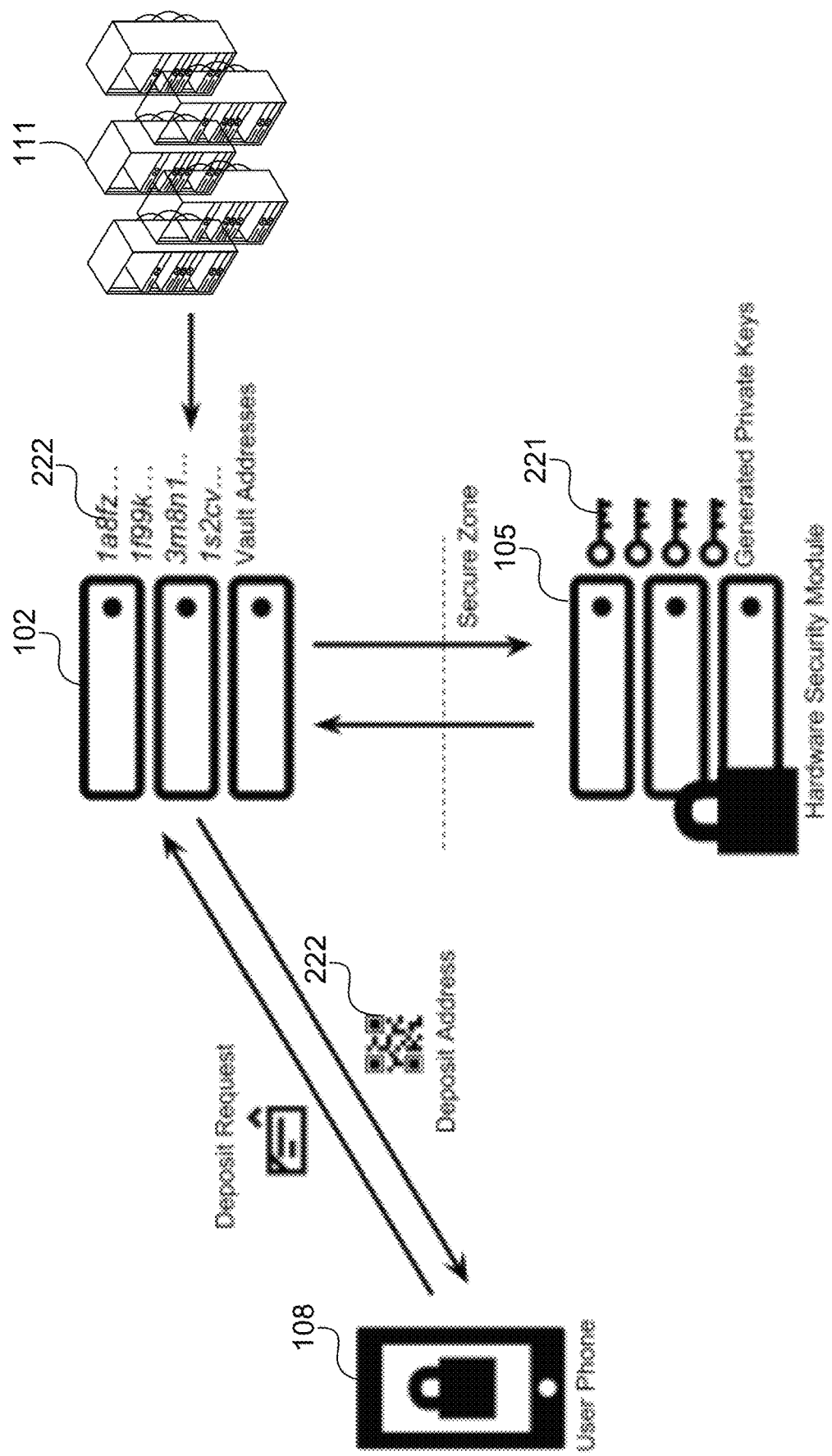
FIG. 2A is a schematic diagram illustrating an example of a deposit process flow with the cryptoasset custodial system.
Figure 2B:
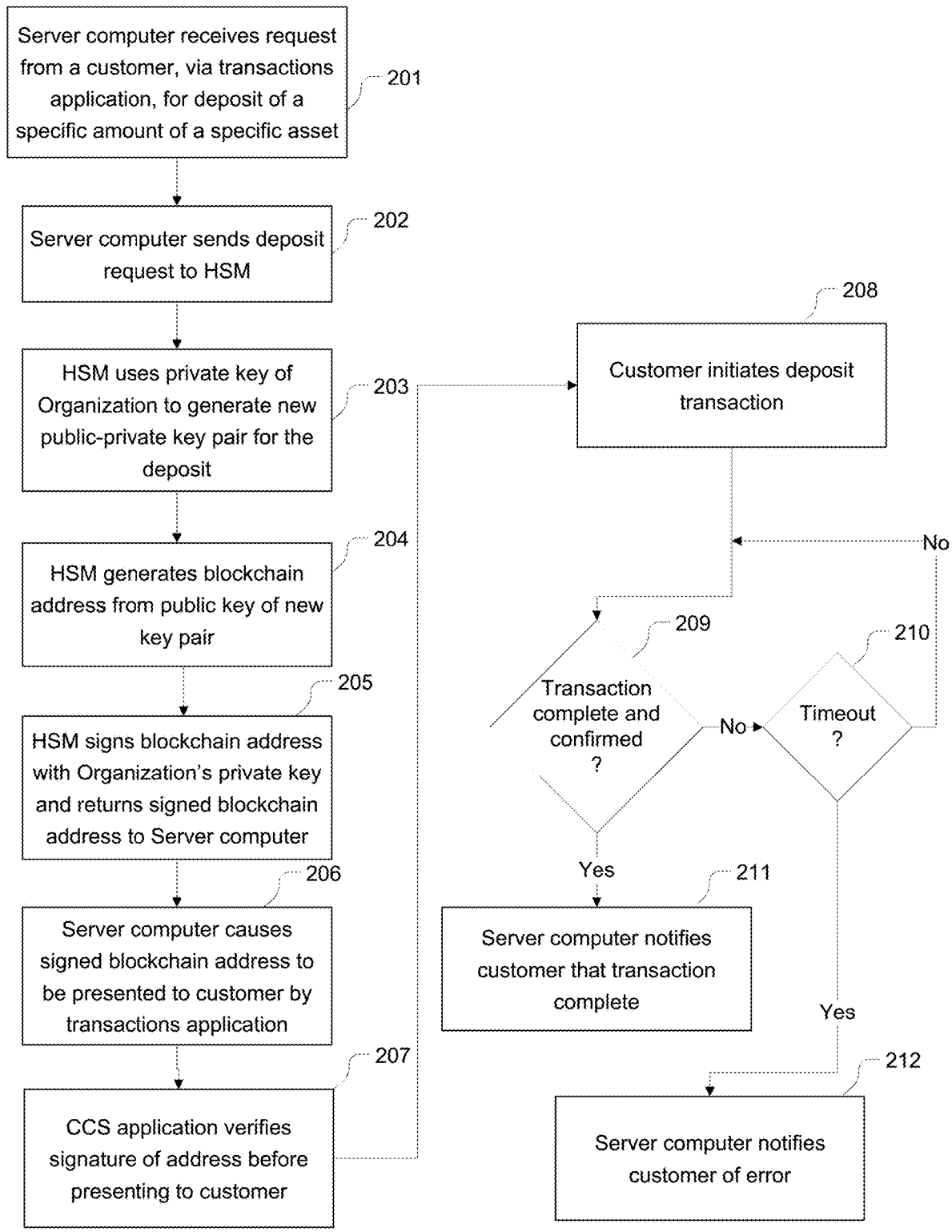
FIG. 2B is a flow diagram illustrating an example of the deposit process flow.

FIG. 2A is a schematic diagram illustrating an example of a deposit process flow with the cryptoasset custodial system 100. FIG. 2B is a flow diagram illustrating an example of the deposit process flow. In some embodiments, deposits are initiated by a customer via the Internet through a software application (hence referred to as the "cryptoasset custodial system application") executing on a user device 108 of the customer. In some embodiments, the initiation of deposit operations is performed using the web dashboard. Such initiation of a deposit request requires a cryptographic endorsement to be performed on the cryptoasset custodial system application.

The initiation of a deposit can be performed by the customer's selecting a cryptoasset type and requesting a deposit for a given amount in the cryptoasset custodial system application. Once initiated, the request for a blockchain deposit address is sent to the server computer 102, which receives the request (step 201) and forwards it (step 202) via the relay server 103 to the hardware security module 105 (which as noted above is isolated from the Internet by the relay server 103). The hardware security module 105 generates (step 203) a new public-private key pair 221 to correspond uniquely with the deposit, i.e., to correspond with the requested blockchain address. In certain embodiments, the hardware security module 105 uses the private key of the relevant Organization and a key derivation function (KDF) to generate the new key pair for the blockchain address. An "Organization" in this context is a data structure that corresponds to a particular account holder or customer, as discussed further below. In one implementation, the private key of the newly generated key pair cannot be extracted from the hardware security module 105, but can be backed up securely in an encrypted file. In this imp lamentation, key generation inside the hardware security module 105 ensures that the private keys 221 only exist within the hardware security module 105, are not available anywhere else in the world and cannot be accessed by any entity that is external to the hardware security module 105.

The hardware security module 105 next generates (step 204) the blockchain address for the deposit from the public key of the newly-created key pair. This can be done by using a well-known blockchain-specific transformation of the public key of the blockchain address. The hardware security module 105 signs (step 205) the blockchain address with the Organization's private key and returns the signed blockchain address to the server computer 102. The server computer 102 causes (step 206) the signed blockchain address 222 to be sent to the customer's client device 108, to cause the client device 108 to present the address to the customer in the cryptoasset custodial system application on a client device 108, in an easy-to-consume and shareable format (e.g., as a QR code), for use as a destination address in a blockchain transaction. The cryptoasset custodial system application on the client device 108 verifies (step 207) the signature of the address before presenting the address to customer.

The customer's client device 108 uses the public key of the Organization (which it previously received from the cryptoasset custodial system 100 and locally stored) to verify the authenticity of the blockchain address it receives from the cryptoasset custodial system 100. The customer initiates (step 208) a transaction to deposit assets into the cryptoasset custodial system 100. The transaction might be initiated from an exchange, from the customer's personal wallet, or from another cryptoasset store. No confirmation is required for the assets to show up in the cryptoasset custodial system 100.

The address of the deposit is stored in a collection with other addresses belonging to the customer in the cryptoasset custodial system 100, known as the customer's "vault." A vault in this context is a data entity that contains assets and a policy map containing one or more policies governing deposits and withdrawals from those cryptoassets as well as participation in transactions related to the cryptoassets. A cryptoasset is represented as a slot inside a vault that can hold an amount of an asset type (e.g., Bitcoin, Ethereum). Once under custody and stored with the cryptoasset custodial system 100, an asset is completely under the control of the cryptoasset custodial system 100.

The server computer 102 determines whether the customer has confirmed the transaction within the defined time period (steps 209, 210). Once the deposit transaction is confirmed by customer and confirmed on the blockchain, the customer is so notified (step 211) by the server computer 102, and the assets are considered to be under custody of the cryptoasset custodial system 100. In the event confirmation is not received within the defined time period, the server computer 102 notifies (step 212) the customer of an error in the transaction.

Figure 3A:
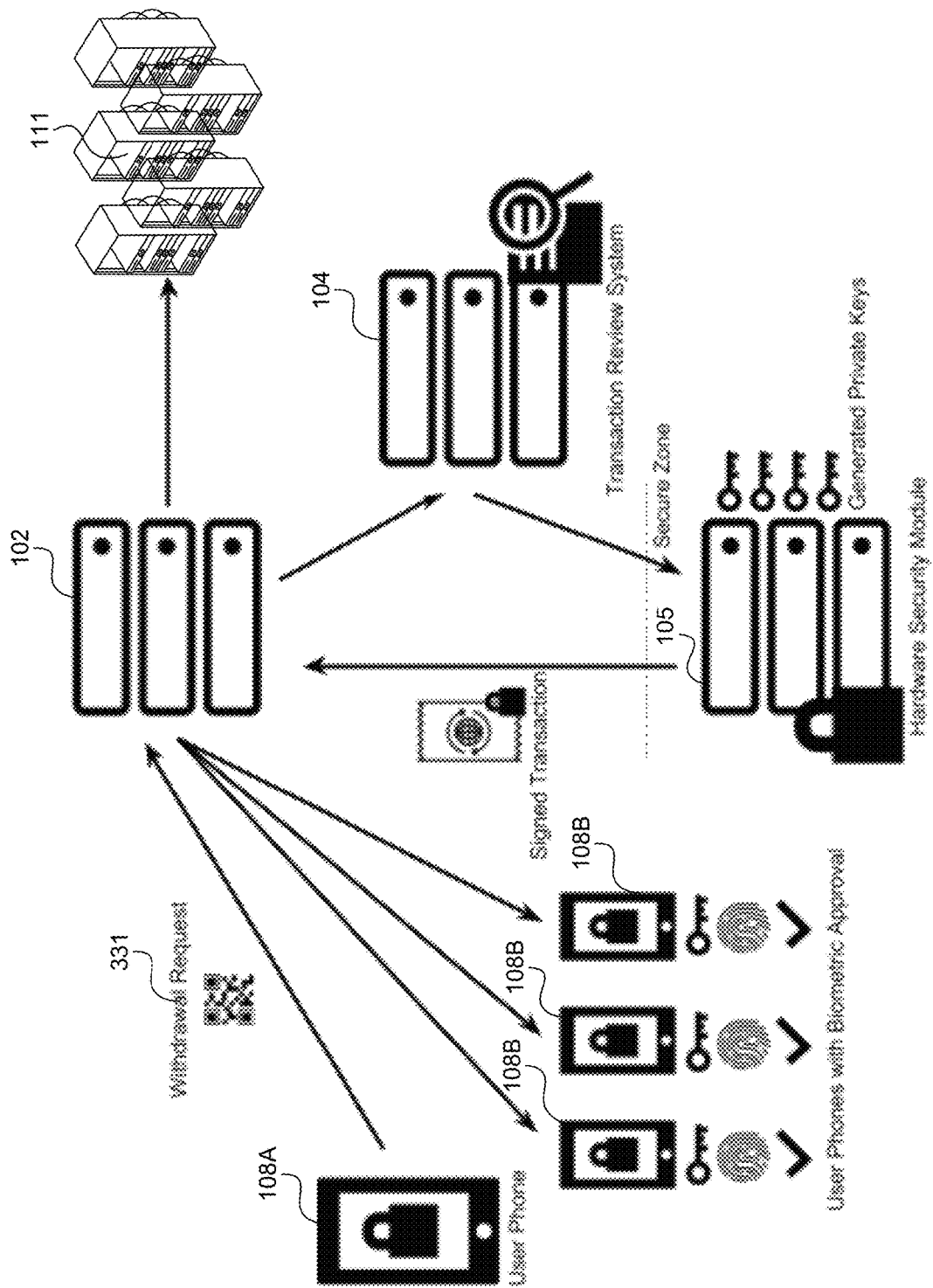
FIG. 3A is a schematic diagram illustrating an example of a withdrawal process flow with the cryptoasset custodial system.
Figure 3B:
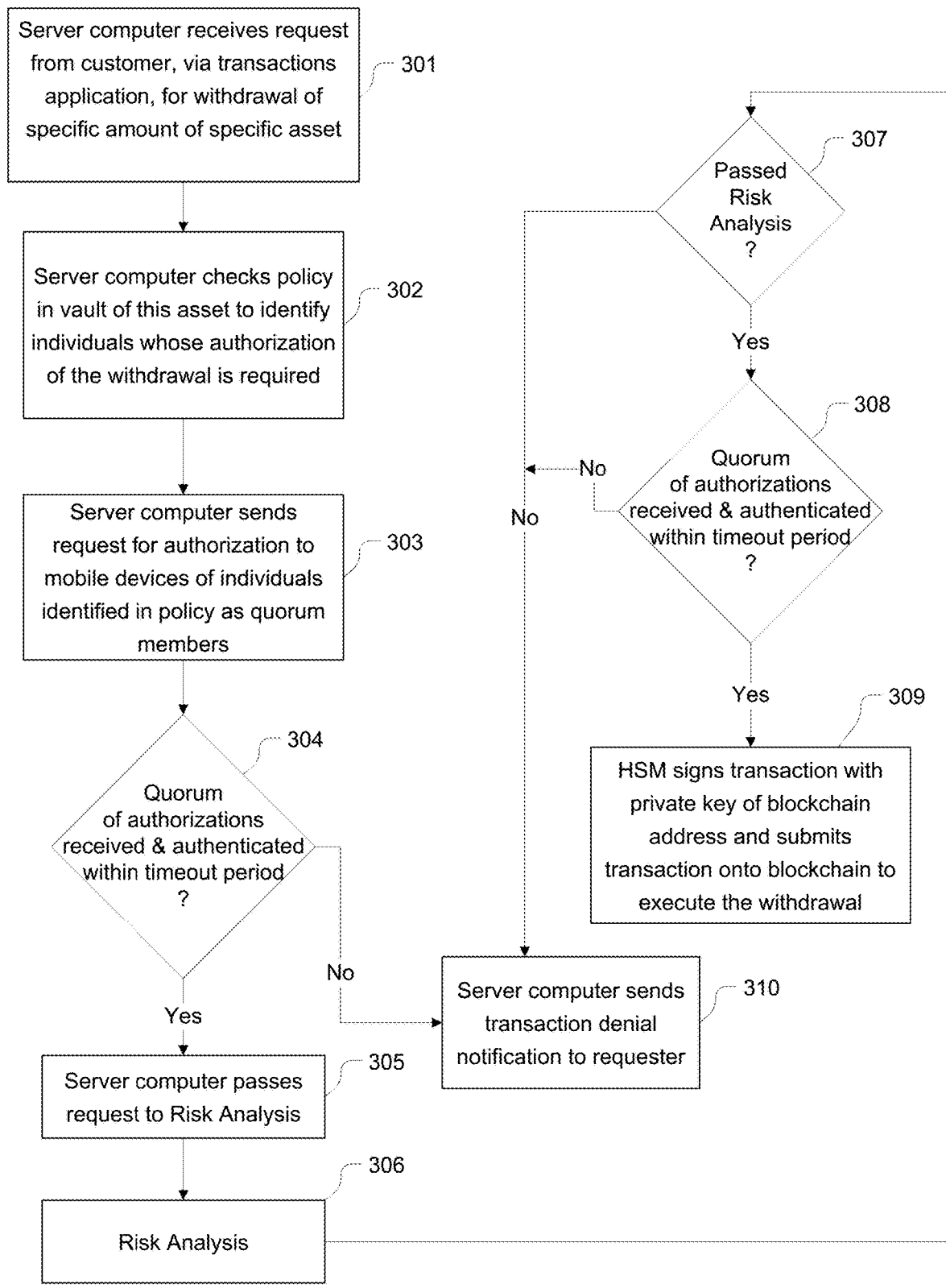
FIG. 3B is a flow diagram illustrating an example of the withdrawal process flow.

FIG. 3A is a schematic diagram illustrating an example of a withdrawal process flow with the cryptoasset custodial system 100. FIG. 3B is a flow diagram illustrating an example of the withdrawal process flow. FIGS. 3A and 3B illustrate an example of the process of withdrawing an amount of a previously deposited cryptoasset, such as a cryptocurrency. Withdrawals can be initiated from the cryptoasset custodial system application on a client device 108A by selecting a specific cryptoasset to withdraw and an amount. Once initiated, authorizing parties are made aware of the withdrawal request. In one implementation, a quorum of authorized customers or users is required to authorize the withdrawal request individually on their mobile devices 108A and 108B. In some embodiments, one or more "required" customers or users are required to authorize the withdrawal request. The one or more "required" customers or users can be part of the quorum. In some embodiments, the defined quorum must be met and all the "required" users must have authorized the transaction. In some embodiments, conditional definitions for "required" users can be implemented. For example, "Require Joe Doe if the USD valuation is above $1 million or if the transaction amount is more than 50% of the holdings for the cryptoasset at a given time." In other embodiments, additional required approvals or conditions are configured for a "policy" to be satisfied.

During this process authorized users are required to review the transaction and approve it, where each user's approval can be subject to biometric authentication (e.g., fingerprint, facial recognition and/or voice recognition). In certain embodiments, before a withdrawal can successfully move on to the next phase, every request is sent to the risk analysis module 104 to be inspected for suspicious activity and authorized as legitimate. The hardware security module 105 can validate that a defined quorum (e.g., a majority, 25%, or 33%) of users have authorized the transaction, and that the transaction was approved by the risk analysis module 104. For example, for a given corporate customer that has five distinct employees who need the ability to transfer funds, a suitable quorum configuration might be to require validated approval from a group of three of those five employees to move any funds. Once the hardware security module 105 validates compliance with a policy map including any quorum requirements, the hardware security module 105 authorizes the requested transaction, e.g., a requested withdrawal, by, signing the requested transaction with the private cryptoasset specific key of the account holder. The server computer 102 submits the signed transaction request to the blockchain 111.

An example of the withdrawal process is further illustrated in FIG. 3B. The server computer 102 initially receives (step 301) the withdrawal request 331 from the customer. The server computer 102 checks (step 305) the approval policy for the cryptoasset that is the subject of the transaction, as indicated in the vault of the cryptoasset, to determine which individuals' authorizations (endorsements) may be used to satisfy a quorum to approve the withdrawal. The server computer 102 sends (step 306) endorsement requests to the mobile devices 108A, 108B of those individuals (the mobile devices have been previously registered with the cryptoasset custodial system 100). In response to these requests, one or more endorsements may be received from users' mobile devices 108A, 108B, where the endorsements were signed locally by the users' respective private keys stored securely in their respective mobile devices and subjected to one or more biometric authentication techniques, as described further below. Accordingly, the server computer 102 determines (step 304) whether, within a timeout period, a quorum of authorizations have been received and the corresponding authorizing parties have been authenticated, as specified in the policy for this cryptoasset. If so, the server computer 102 passes (step 305) the transaction request 331 to the risk analysis module 104. Otherwise, the server computer sends (step 310) a transaction denial notification to at least the user who requested the transaction (and possibly to all other users identified in the policy for this cryptoasset).

The risk analysis module 104 can perform a risk analysis (step 306), which as noted above may be fully or partially automated. If the transaction passes risk analysis (step 306), control flow is passed to the hardware security module 105, which verifies (step 308) whether the quorum requirement has been satisfied, by performing the same determination as step 304 or a similar determination, as does the risk analysis module 104 (step 306) (described further below). If satisfaction of the quorum is verified by the hardware security module 105, the hardware security module 105 signs the withdrawal transaction with the private key of the blockchain address. The server computer 102 submits the transaction onto the blockchain 111 to execute the withdrawal (step 309). Otherwise, the hardware security module 105 signals a failure to the server computer 102, which in response sends (step 310) a transaction denial notification to at least the user who requested the transaction (and possibly to all other users identified in the policy for this cryptoasset).

As mentioned above, when a user endorses a transaction request, they can be subjected to one or more forms of authentication by their mobile device and/or the cryptoasset custodial system 100, to establish that they are the expected person taking the action. These authentication forms can include one or more biometric authentication techniques, such as fingerprint verification, voiceprint verification, speech recognition, facial recognition and/or gesture recognition. The user's mobile device (e.g., smartphone) can perform one or more of these authentication techniques.

Additionally, or alternatively, the user may be required to upload to the cryptoasset custodial system 100 a video, captured by their mobile device, from which their identity can be proven by, for example: identifying the user's face in the video against images of known faces (e.g., previous videos of the user); identifying the user's voice in the video against their trained voice profile; requiring the user to say certain words or take certain actions in the video based on the transaction (see further discussion below); requiring the user to make a previously specified gesture, or a distress gesture if they are in distress; requiring the user to identify on video the expected room they are in; and/or other performing any other actions that are considered to increase the level of confidence that the user is who he or she purports to be.

When determined to be necessary, a user may be asked to complete challenges to authenticate that he or she is in fact the person who is authorized to act on the transaction. These challenges may be generated deterministically based on the context of the transaction. For example, based on critical information in a transaction such as the ID, amount, destination, etc., the cryptoasset custodial system 100 may generate a random number that can be used to select a few (e.g., three to five) words from a set of known words. The cryptoasset custodial system 100 may present those words to the user and have the user speak them in a video captured by the user's mobile device, which the user's mobile device transmits to the cryptoasset custodial system 100. When reviewing the transaction, the reviewing mechanism or a human reviewer can independently generate the expected words based on transaction data and verify that the user spoke those words. The video can also be subject to facial and/or voice recognition. By performing this type of deterministic challenge generation, an attacker can be prevented from faking a transaction by capturing and reusing previously transmitted authentication videos from the user.

Figure 4:
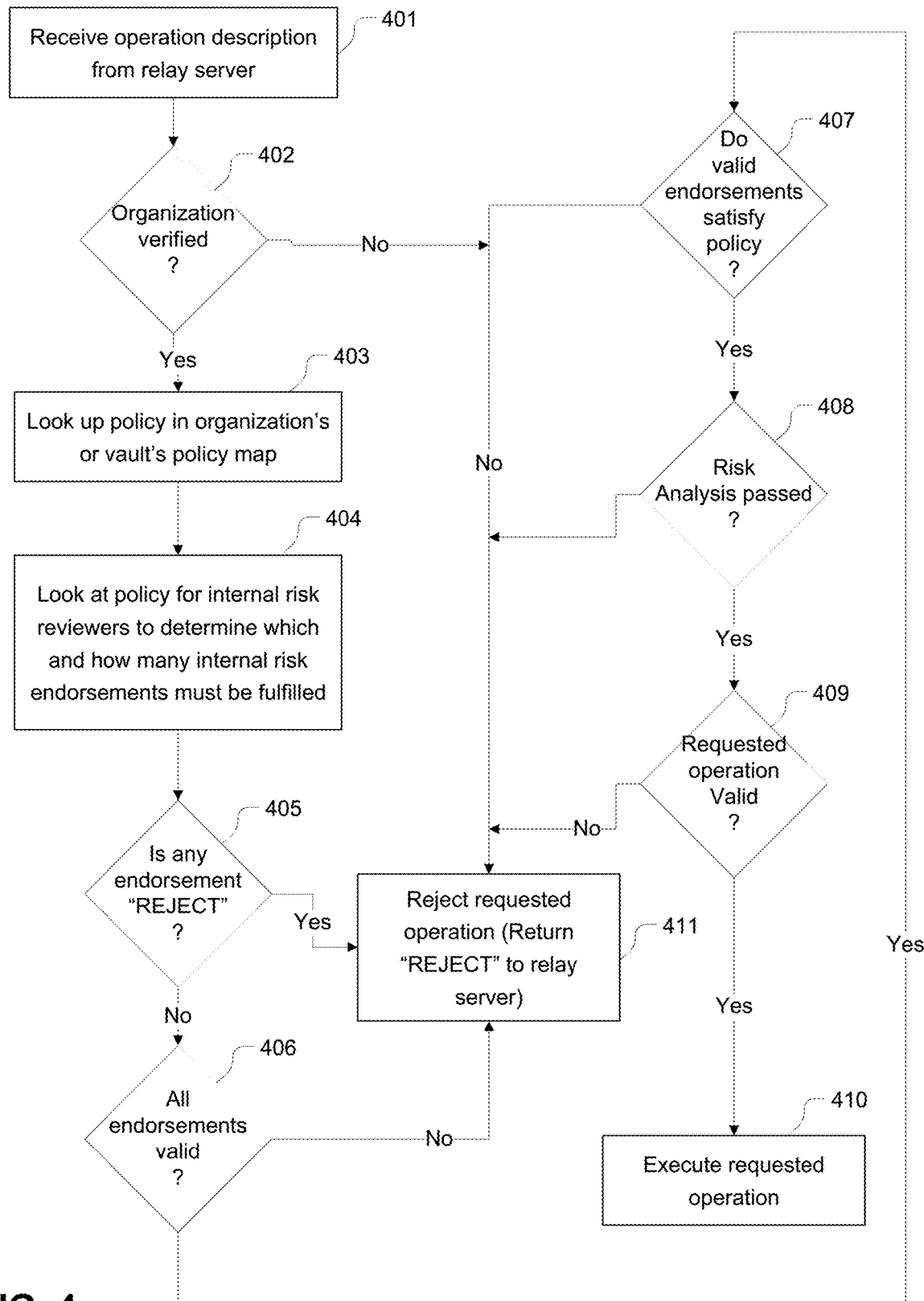
FIG. 4 is a flow diagram illustrating an example of a process performed by a hardware security module in connection with a requested operation.

FIG. 4 is a flow diagram illustrating an example of a process performed by a hardware security module 105 in connection with a requested operation. The main role of the hardware security module 105 is to verify the validity of operations. The hardware security module 105 carries out the will of the signers and authenticates that the signers are the authorized parties of an operation through the hardware security module 105's privileged access to keys. At least one key needed for signing transactions is stored securely in the hardware security module 105 and never leaves the hardware security module 105. In some embodiments, the hardware security module 105 enforces these policies through a Secure Execution Environment (SEE) that runs code that cannot be changed except through physical access to the hardware security module 105 and requires a set of smartcards held securely by multiple employees of the Cryptoasset Custodian.

In certain embodiments, to facilitate the above-mentioned functionality the hardware security module 105 stores, in its internal storage 107, multiple instances of a data structure called "Organization," i.e., one instance for each customer of the Cryptoasset Custodian. In one implementation, the Organization data structure can contain the following fields: an identifier (ID) of the organization, a name of the organization, a public key of the organization, a list of users who belong to the organization, a policy map, a list of vaults that belong to the organization and their respective policy maps, and a generation number that is incremented each time the organization structure is updated. A "policy map" is a set of policies, including one policy for each possible action that may be carried out (e.g., add user, change vault policy, etc.). An Organization data structure is signed by the hardware security module 105, using the Organization's private key (which cannot be read by any external entity), to indicate that it was produced through a valid set of changes authorized by the users and risk reviewers. In some embodiments, the hardware security module 105 keeps track of the most recent version to prevent rollback attacks. In other embodiments, the hardware security module 105 code is versioned and there are checks in the upgrade process to prevent rollback attacks.

To onboard a new customer, the hardware security module 105 creates a new Organization instance. To help ensure adequate security, the hardware security module 105 may create the Organization with the requested set of users already in it. In some embodiments, the hardware security module 105 must generate new unique keys for every new Organization created this way. This prevents an attacker from attempting to spoof or duplicate IDs with existing organizations, since every organization has a unique client key.

FIG. 4 illustrates an example of a process that may be performed by the hardware security module 105, in at least some embodiments, in response to a request to carry out an operation. The request may be received by the hardware security module 105 from the relay server 103. Initially, the hardware security module 105 receives (step 401) from the relay server 103 an operation description, which specifies an Organization. The operation description is a set of data and metadata describing a requested operation, such as a requested deposit, withdrawal or transfer of cryptocurrency. The hardware security module 105 verifies (step 402) the integrity of the specified Organization.

The hardware security module 105 looks up the policy in the Organization's or the vault's policy map (step 403). It looks at the policy for internal risk reviewers to determine which and how many internal risk endorsements (i.e., endorsements by personnel of the Cryptoasset Custodian) must be fulfilled (step 404). Next, the hardware security module 105 can determine (step 405) whether any of the received cryptographic endorsements (from users) indicates to "REJECT" the requested operation. If so, the hardware security module 105 can reject (step 411) the requested operation, by returning a "REJECT" message to the relay server, which returns a corresponding "REJECT" message to the server computer, to cause notification to the requester. In this case, the hardware security module 105 does not bother checking any further signatures and just rejects the operation.

The hardware security module 105 determines (step 406) whether all of the received endorsements for the transaction are valid. This includes verifying the validity of the endorsements provided by checking that: i) the user is in the Organization, ii) the signature is correct for the specified operation, and iii) each of the signatures has an "APPROVE" decision. If not all of the received endorsements for the transaction are valid, the process proceeds to step 411 as described above.

If all received endorsements for the transaction are valid, the hardware security module 105 determines (step 407) whether the endorsements satisfy the relevant policy for the subject cryptoasset (i.e., satisfy the specified quorum). If the valid endorsements do not satisfy the policy, the process proceeds to step 411 as described above. If the endorsements satisfy the policy, the hardware security module 105 determines (step 408) whether the requested operation passed the risk analysis module 104. If not, the process proceeds to step 411 as described above. If the requested operation passed the risk analysis module 104, the hardware security module 105 determines (step 409) whether the requested operation is valid. This step can include verifying that the operation is internally consistent and that the operation can be applied to the Organization, vault or asset that it targets. If the requested operation is not valid, the process proceeds to step 411 as described above. Otherwise, the hardware security module 105 executes (step 410) the requested operation (or triggers an action to cause it to be executed). An operation to change the Organization, vault or policy results in a new signed Organization data structure with a higher generation value and the change applied to it. An operation to withdraw assets results in the hardware security module 105 signing a blockchain transaction with the private key corresponding to the subject asset. An operation to deposit assets results in the hardware security module 105 generating a deposit address.

Figure 5:
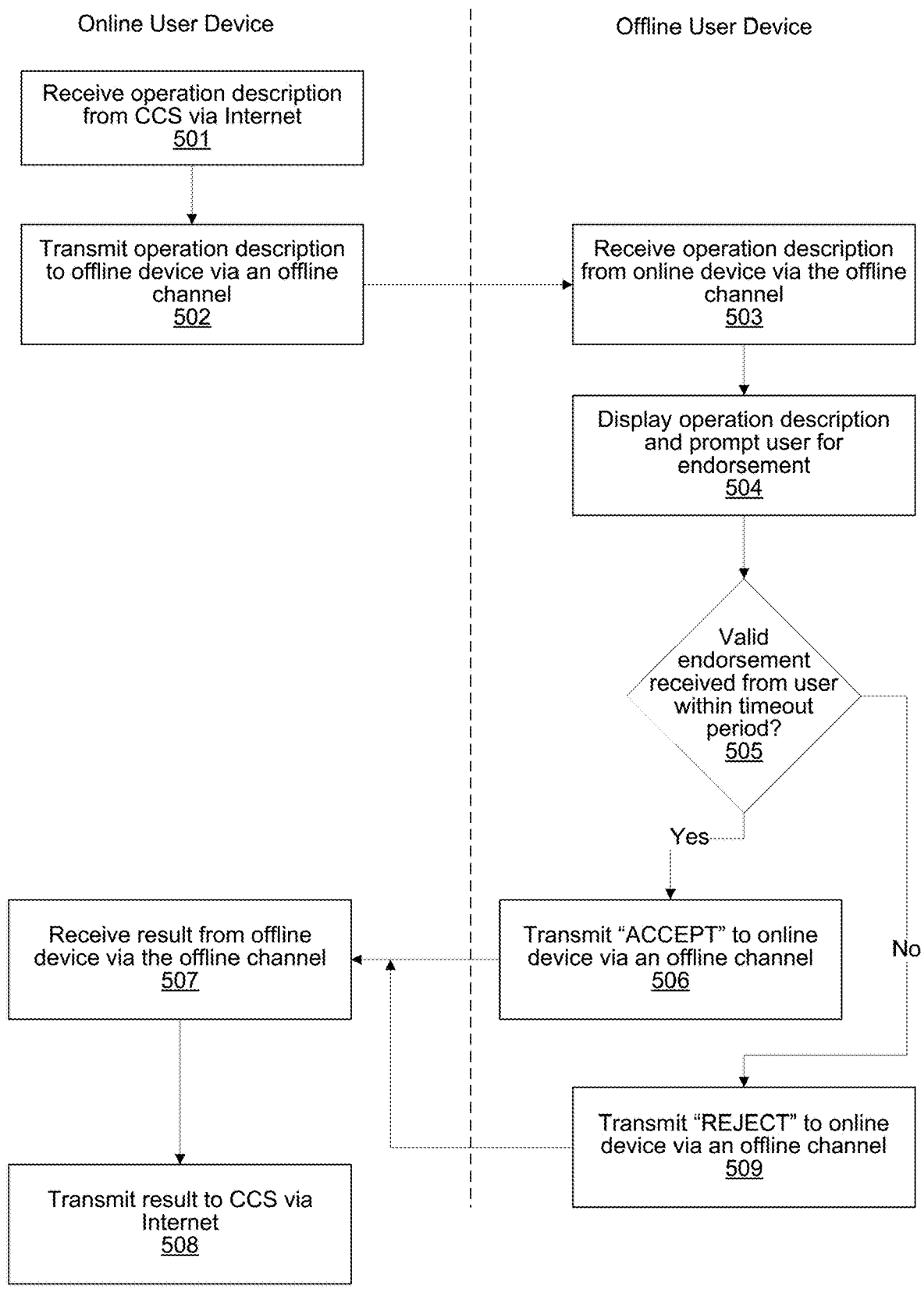
FIG. 5 is a flow diagram illustrating an example of a process for using an offline client device to endorse a requested transaction.

FIG. 5 is a flow diagram illustrating an example of a process for using an offline client device to endorse a requested transaction. As a method for reducing the risk for users interacting with the cryptoasset custodial system application on their personal devices, the cryptoasset custodial system 100 may require authorization from an offline device. This device, such as a consumer phone with secure enclave or similarly capable computing device such as an iPod Touch or personal digital assistant, will be completely disconnected from the Internet in its normal state, and used in an offline manner to sign transactions required for authorization.

The process may be carried out as follows. The user has a phone or similar device that is a member of his or her vault policy's quorum and is not connected to any wireless or cellular networks. The device runs software similar to the cryptoasset custodial system application software for enabling a user to endorse requested transactions, or the same software operating in a different mode. The user initiates a transaction against his or her vault through a different device in the quorum. An online device, such as another phone or web browser, has access to the transaction. It may be another phone/secure device in the quorum or it may exist solely for the purpose of displaying transactions. The device has the ability to transmit data that is required to be signed by the offline device, to the offline device. This can be done through a channel that cannot be accessed over the Internet, such as displaying a QR code, playing a sound or sequence of sounds that encodes data, or transmitting over Bluetooth. The offline device displays the data that was transmitted for it to sign, for the user's approval or rejection. The offline device signs its endorsement of the operation based on the user's desired action. The offline device communicates its signed payload back to the online device in a similar manner to how it was received (e.g., displaying a QR code, playing a sound or sequence of sounds that encodes data, or transmitting over Bluetooth). The online device communicates the signed decision payload back to the server computer of the cryptoasset custodial system 100.

In FIG. 5, an online client device receives (step 501) an operation description from the cryptoasset custodial system 100 via the Internet. The online client device (e.g., client device 108) transmits (step 502) the operation description (or a portion thereof) to the offline client device using an offline channel. As noted above, the offline channel is a channel that is not accessible via the Internet, such as a local visual display by the online client device, a sound or sequence of sounds generated by the online client device, or a short range wireless transmission from the online client device (e.g., via Bluetooth). The offline client device receives the operation description (step 503) from the online client device via the offline channel, and based on the information thereby received, displays the operation description (or portion thereof) and prompts the user for endorsement of the operation (step 504). If a valid endorsement is received by the offline device (step 505) as user input within a timeout period, the offline device transmits an "ACCEPT" message (step 506) to the online client device via the same offline channel by which it received the operation description, or via a different offline channel. The online client device receives the results of the endorsement from the offline device (step 507) and transmits the result payload to the cryptoasset custodial system via the Internet (step 508). If a valid endorsement is not received by the offline client device from the user within the timeout period (step 505), the offline client device transmits a "REJECT" message to the online client device via the offline channel, which in turn transmits the "REJECT" payload to the cryptoasset custodial system via the Internet (step 508).

The offline device may be delivered to the user with its secure key pre-enrolled in the Organization, or it may be allowed to be online for the initial enrollment process, or it may send its enrollment through a similar procedure to the authorization process.

The cryptoasset custodial system software on the offline device may need to be updated periodically. To allow such updates, the offline device may be scheduled to connect to the Internet via Wi-Fi and have its software updated at a predefined cadence, or it may detect that its software needs to be updated as a result of receiving a transaction to sign from the online client device, that indicates that the version of the software on the offline device is no longer compatible. Whenever the device is online, it can record as well as attempt to transmit to the cryptoasset custodial system 100 the fact that it can access the Internet so that that information may be used to assess risk by the platform at a later time.

In addition to being kept offline, the offline client device and one or more online devices may be restricted to act on a transaction only when in range of a predefined beacon. A wireless (e.g., Bluetooth) beacon device can be made available to the user, and the cryptoasset custodial system 100 application may refuse to authorize transactions unless it detects that the beacon is available.

Every transaction submitted to the cryptoasset custodial system 100 is recorded in an internal ledger that is tamper-resistant and that allows auditors to have cryptographic proof of every historical event on every user's account. The ownership of a blockchain asset is controlled by the possession of the private key corresponding to the public wallet address. The cryptoasset custodial system 100 can prove ownership of these assets to auditors by making use of the private key corresponding to a user's vault to sign a string of randomly chosen text chosen by the auditors. Consider the following example:

An auditor wishes to see proof that the cryptoasset custodial system 100 has access to funds in wallet identified by the address, "1BvBMSEYstn5Au4m4GFg7yJaNVN2." The auditor therefore randomly generates a long string, e.g., "xGG8vQFnd8QDwHz6Uj1GX," and submits the following challenge:

```
{
    Address: 1BvBMSEYstn5Au4m4GFg7yJaNVN2 ,
    Token: " AUDIT-CHALLENGE- xGG8vQFnd8QDwHz6Uj1GX",
}
```

The cryptoasset custodial system 100 receives the challenge and forwards it to the hardware security module 105 as a predefined templated serialized package. The hardware security module 105 is programmed to accept and sign such audit requests (which are not arbitrary payloads and therefore are not at risk of being later interpreted as a signed blockchain transaction) with the private key associated with the specified address. The cryptoasset custodial system 100 returns the valid signature for the challenge that can be independently verified by the auditor. This verification proves that the cryptoasset custodial system 100 has control over a private key associated with an entry on the blockchain, achieving proof of control of the asset.

In certain embodiments, the cryptoasset custodial system 100 includes a Thresholding Service that enables other parts of the system (risk analysis module 104 and hardware security module 105) to securely determine that user operations and transactions have followed the customer specific business logic and have been approved by a human/automated risk review system. The Thresholding Service can verify multi-signature (multi-user) quorums to achieve this.

The Thresholding Service validates operations initiated and approved by users to ensure that they've met a threshold quorum before being executed. Such operations may include transactions, adding or removing other users, etc. Different users can have different access control roles (e.g., view-only, initiate-transaction-only, authorizable, necessary). The cryptoasset custodial system 100 is able to notify every reportable status of the quorum acceptance lifecycle, but is not able to sign-off on operations that have not been authorized by customers. All actions are logged in an append-only ledger for auditability over all account interactions.

One function of the Thresholding Service is to verify that a quorum of authorized users have signed-off on a requested operation. Qualifying operations that may require a quorum may include, for example, proposing a transaction (e.g., "withdraw 100 Bitcoin"), adding a user to an account, changing a user's permissions, removing a user from an account, and changing the thresholding logic. A quorum may be defined as an absolute majority of users by default (e.g., 3 out of 5), or it may be set to a custom quorum upon onboarding of the customer. Moreover, an authorized user can configure a quorum to require certain specific users to endorse a transaction to constitute a quorum. The cryptoasset custodial system 100 may also allow thresholding across multiple required groups. For example, in a company a majority of the finance team may be required to sign off, as well as the front office.

In certain embodiments, the Thresholding Service implements a fine-grained access control model in its quorum verification, in which different users can have different access levels, which may include the following levels, for example:

View-Only
  This is the default access level
  Users in this level can view all asset positions
  Users in this level can flag any transaction
  Users in this level can freeze all assets
View-Authorize
  Users in this level can act as an authorizing vote for an action toward a quorum
  Users in this level can view all asset positions
  Users in this level can flag any transaction
  Users in this level can freeze all assets
View-Authorize-Necessary
  Users in this level are a required vote for an action
  Users in this level can view all asset positions
  Users in this level can flag any transaction
  Users in this level can freeze all assets In certain embodiments, the access level for a user can only be changed with an appropriately verified quorum that is verified by the Thresholding Service.

As noted above, user approvals for an action can be expressed by a cryptographic digital signature, to benefit from non-repudiation guarantees. The Cryptoasset Custodian can be certain that the associated user who holds the private key was indeed the user who approved the action, since digital signatures cannot be forged. In certain embodiments, a user's signature is generated from an iOS secure enclave in the user's mobile device, and forwarded to the cryptoasset custodial system 100 by the iOS application programming interface (API) component in the client device 108. Signatures can be performed over the cryptographic hash of the transaction contents to ensure that the transaction cannot be tampered with. All users may be required to sign the same hash for the same transaction identifier (ID) in order for the signatures to count toward the quorum. The Thresholding Service can provide templates for the clients to sign, and can verify all completed signatures completed by the iOS client. In at least some embodiments, the Thresholding Service verifies signatures with the public components of the users' signing keys, but does not hold the private components of those user signing keys.

Once a threshold has been satisfied, the Thresholding Service will publish the corresponding signature data to the risk analysis module 104 to be further analyzed before sign-off by the risk analysis module 104, and will serialize the signature data into a payload to be consumed by the hardware security module 105 signing service. Each additional signature provided to the Thresholding Service and verification can be recorded in the append-only log service. This will provide additional auditing and status updates in addition to the metadata captured in the Thresholding Service's storage, which will be essential for providing consumable updates to user clients.

It is assumed that authorized members of a quorum are available to cryptographically sign transactions. Therefore, the quorum should be kept "live"—that is, at any given time, the cryptoasset custodial system 100 has reasonable confidence that all potential members of the quorum maintain possession of their secure device keys and can actively participate in a transaction. In certain embodiments, the cryptoasset custodial system 100 can do the following to achieve this level of confidence:

1. Have access to the set of user public keys required to fulfill a policy's quorums.

2. Set a liveness threshold for a policy, i.e., the amount of time after which one considers a key to be at risk of unavailability. This can be fixed or related to normal transaction cadence.

3. Require users to periodically sign a proof transaction with their private keys. This can be explicit as a liveness check or hidden/implicit by requiring their key for routine operations such as login.

4. Record the latest live time of any one or more users' keys.

5. Continuously monitor whether any user's live time has exceeded the liveness threshold.

6. Use the above information to prompt the user to prove they still have access to their signing key and/or inform other users that the quorum may be at risk.

The risk analysis module 104 can implement an API, called the Risk API, and can further include human review of all transactions and administrative user operations. In some embodiments the Risk API drives the human review system. The Risk API can provide integration with an internal risk dashboard, for human employees of the Cryptoasset Custodian to manually review each transaction.

In certain embodiments, all transactions are manually approved by designated employee(s); all administrative user operations (adding, removing, permission changes) are manually approved by designated Cryptoasset Custodian employee(s); reviewable entities must have passed an automated verification process before requiring risk analysis; reviewable entities must provide robust context about the user approvals, for both human and further automated inspection; and risk approvals and denials are logged in an append-only ledger for auditability.

The Risk API reverifies the appropriate threshold as determined by the Thresholding Service. The Risk API may also handle additional business logic, such as in embodiments where the Thresholding Service is simplified: for example, the Risk API could check for necessary signers if the Thresholding Service only checks for quorums. Other functions described herein can also be moved between modules.

The Risk API can receive contextual data about each user involved in a transaction, to present to a human and/or classification system. This information may include, for example, user(s) who approved the transaction, time of approval(s), location of approval(s), and device/key ID(s) that approved the transaction. This data can be fed into an internal Risk Analysis dashboard, and possibly other automated review systems.

In some embodiments, the Risk API requires human approval from one or more employees of the Cryptoasset Custodian if a transaction passes the manual and automated risk review. To approve, an employee may be required to sign with a cryptographic key if he or she approves the transaction/operation and present the signature to the Risk API for validation. Moreover, there are preferably multiple keys, one per risk reviewer, such that it is logged who performed the review. Preferably it is made easy to rotate a risk-approval key in case of compromise.

Figure 6:
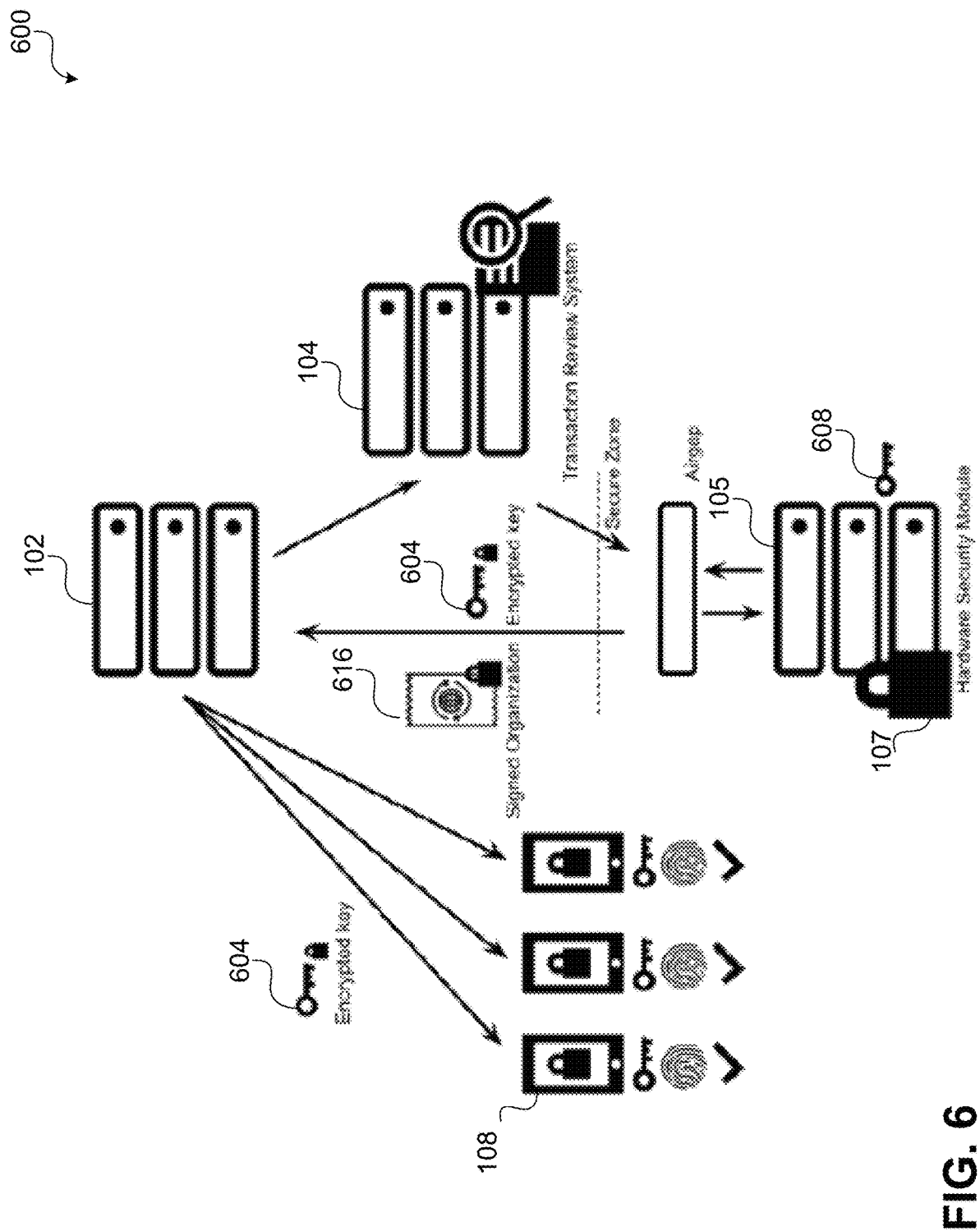
FIG. 6 illustrates an example operational flow for a cryptoasset custodial system using encrypted and distributed client keys.

FIG. 6 illustrates an example operational flow 600 of a cryptoasset custodial system 100 using encrypted, distributed client keys. The cryptoasset custodial system 100 includes the online server computer 102, the relay server 103, the hardware security module 105, the risk analysis module 104, and the data storage facility 106 as described in more detail with reference to FIG. 1.

The cryptoasset custodial system 100 receives a request from a new account holder or an existing account holder to create a new account. The account is to access and perform transactions on a cryptoasset, such as a cryptocurrency. The account holder can be an individual, a company, a university, a business, a government, etc. The hardware security module 105 of the cryptoasset custodial system 100 generates a new client key 608 for the account holder of the cryptoasset custodial system 100. The client key 608 is an account-holder-specific, asset-agnostic, cryptographic key. If certain conditions are met, the cryptoasset custodial system 100 can use the client key 608, or a cryptoasset key derived from the client key 608 to authorize a cryptoasset transaction. The client key 608 can sometimes be referred to as a "client seed" or a "master seed."

The hardware security module 105 is a special-purpose physical computing device that safeguards and manages digital keys for authentication and provides cryptoprocessing functionality. The hardware security module 105 is illustrated and described in more detail with reference to FIG. 1. The hardware security module 105 is communicably coupled to the relay server 103. In some embodiments the client key 608 produces a random digital signature. For example, the client key 608 can be used a seed for a random digital signature generator. The hardware security module 105 can generate the client key 608 by generating a digital signature public/private key pair and encrypt the client key 608 using a hardware-based cryptographic key (an in-hardware master key of the hardware security module 105).

The hardware security module 105 encrypts the client key 608 to generate an encrypted client key 604 using the hardware-based cryptographic key. The encryption is performed within a secure storage device 107 of the hardware security module 105. Because the hardware security module 105 performs the encryption using the hardware-based cryptographic key, only the hardware security module 105 and not another entity, can later decrypt the encrypted client key 604. No other entity has the same embedded hardware of the hardware security module 105. Thus, no other entity, including the client device 108, will be able to decrypt the encrypted client key 604. A malicious entity will not be able to decrypt the encrypted client key 604.

The secure storage device 107 of the hardware security module is a hardware-based secure enclave, so called, due to the physical access required in order to be compromised. For example, access to the hardware security module 105 can be enabled only when a token is connected or a correct personal identification number (PIN) is entered to the hardware security module 105. Unauthorized access by a malicious user or a malicious program can be interrupted, making unauthorized access to data more difficult.

The server computer 102 is a computer device including software that provides functionality for client programs and devices, such as the client device 108. The online server computer 102 of the cryptoasset custodial system 100 transmits the encrypted client key 604 to the client devices 108 of authorized representatives of the account holder. Each client device 108 can be a smartphone, a tablet, a laptop, or a desktop. A client device 108 can also be an offline device, as illustrated and described in more detail with reference to FIG. 5, in which case the mechanisms for providing information to the offline device described above with reference to FIG. 5 would apply. The online server computer 102 is communicably coupled to the hardware security module 105 via a relay server 103. For example, a half-duplex relay server 103 can be used as illustrated and described in more detail with reference to FIG. 1. The half-duplex relay server 103 can function as a bridge over a physical air-gap between the online server computer 102 and the hardware security module 105 to prevent a malicious entity from establishing a direct (e.g., interactive) connection to the hardware security module 105. The client devices 108 communicate with the cryptoasset custodial system 100 over the network 109 as illustrated and described in more detail with reference to FIG. 1.

In some embodiments, more than one, e.g., each, client device 108 stores a copy of the encrypted client key 604 in an offline secure enclave 114 of the client device 108. In one implementation, the copies of the encrypted client key 604 are exclusively stored on the client devices 108 and not on a cloud or the hardware security module 105. Thus the encrypted client key 604 is stored in a distributed manner. The embodiments disclosed herein provide security advantages since a malicious entity must compromise both a client device 108 as well as the hardware security module 105 to gain access to the client key 608. Moreover, the copies of the encrypted client key 604 stored on the different client devices 108 provide redundancy and security advantages (encrypted client keys 604 are inherently backed up on multiple client devices 108).

With reference to FIGS. 1 and 5, in some embodiments, the secure enclave 114 is offline because the client device 108 itself is offline as illustrated and described in more detail with reference to FIG. 5. With reference to FIGS. 1 and 6, a first online client device can receive the encrypted client key 604 from the cryptoasset custodial system 100 over the network 109 and send the encrypted client key 604 for storage to a second, offline client device 108. The offline client device 108 stores the encrypted client key 604 in the secure enclave 114 of the offline client device 108.

The hardware security module 105 deletes the encrypted client key 604 from the secure storage device 107 once it has generated and sent the encrypted client key 604 to the client devices 108 of authorized representatives of the account holder. Thus, the copies of the encrypted client key 604 are stored in a distributed manner only on the client devices 108 and not on the hardware security module 105. The hardware security module 105 is the only entity capable of decrypting the encrypted client key 604. However, the hardware security module 105 does not possess the encrypted client key 604. Therefore, a malicious entity that manages to hack in to the hardware security module 105 would not have access to, and would not be able to gain access to, the client key 608. Each client device 108 stores the encrypted client key 604. However, the client device 108 itself is unable to decrypt the encrypted client key 604 because the client device 108 does not possess the hardware-based cryptographic key of the hardware security module 105. Thus a malicious entity that manages to hack into the client device 108 to access the encrypted client key 604 would not be able to decrypt the encrypted client key 604. Thus the encrypted client key 604 is stored in a secure, distributed, and redundant manner. The copies of the encrypted client key 604 stored on the different client devices 108 provide redundancy advantages.

The cryptoasset custodial system 100 receives a request to authorize a cryptoasset transaction. For example, a representative of the account holder can seek to buy, sell, transfer, withdraw, deposit, or otherwise access a portion of the cryptoasset (e.g., a cryptocurrency) recorded in the blockchain 111. The blockchain 111 is illustrated and described in more detail above with reference to FIG. 1. In some embodiments, each transaction request submitted using a client device 108 will go through the risk analysis module 104, which may be partially or fully automated. For example, with some embodiments, automated risk analysis software can make a decision on whether a proposed cryptoasset transaction is acceptable.

An authorized representative of an account holder can use a client device 108 to request a transaction involving a cryptoasset, such as a withdrawal or a transfer involving cryptocurrency funds. In response to receiving such a transaction request, the cryptoasset custodial system 100 causes an endorsement request message to be sent to client devices 108, each of which is associated with a different representative of the account holder who has been defined as a potential member of a quorum for transactions involving that cryptoasset (in other embodiments, multiple representatives can share the same client device 108). The endorsement request message is configured to cause each receiving client device 108 to prompt a representative to provide an endorsement of the requested transaction. An endorsement in this context is an approval or rejection of an operation (e.g., a transaction) by a client device 108. When a representative receiving such a prompt endorses the transaction on a client device 108 (e.g., a smartphone, tablet or notebook computer), the client device 108 signs an endorsement message with a private key of that client device 108 and transmits the signed endorsement message to the system 100. The private key can be stored within the secure enclave 114 within the client device 108.

The hardware security module 105 determines that signed messages endorsing the cryptoasset transaction have been received from at least some of the client devices 108 in satisfaction of a quorum for endorsing the cryptoasset transaction. Thus, even if a malicious entity manages to hack into a single client device 108 and somehow send a spoofed endorsement message, the malicious entity will not be able to satisfy the quorum using a single client device 108. In some embodiments, the hardware security module 105 determines that the signed messages have been received in satisfaction of the quorum by verifying a policy map specifying the client devices 108 and a threshold number of the client devices 108 required to endorse the cryptographic transaction. For example, the threshold can be 7 devices, 30% of the devices, or 70% of the devices. A cryptoasset can be assigned to one of multiple different vaults in the cryptoasset custodial system 100. Each of the different vaults can have a vault-specific policy map that defines vault control rules governing which actions are allowed for the vault under one or more specified conditions. The policy map can specify the individual representatives or client devices 108 corresponding to the vault to which the cryptoasset has been assigned.

The hardware security module 105 validates messages from the client devices 108 by checking cryptographic digital signatures using public keys corresponding to the private keys of the client devices 108. For example, the hardware security module 105 can validate the received endorsement messages (as specified by the policy map) by checking cryptographic digital signatures. For example, firmware running in the hardware security module 105 can verify digital signatures generated by hardware-based private keys residing on hardware security tokens of the representatives. A hardware security token is a physical device that a representative can use to interact with an electronically restricted resource, such as the cryptoasset custodial system 100. The hardware security token functions like an electronic key to authenticate an identity of the representative of the account holder, such that the hardware security token can prove that the representative is who they claim to be. If a threshold number (as set by the policy map)

of valid endorsement messages are not confirmed, the cryptoasset transaction is rejected.

The hardware security module 105 confirms that the endorsement messages are in accordance with control rules of the policy map after the endorsement messages have been validated for the threshold number of the specified client devices 108. For example, it is confirmed that the number of valid endorsements meets a threshold, as specified by the policy map. Further details of the quorum-based policy are described in more detail with reference to FIGS. 1, 3A, and 3B.

The online server computer 102 receives the encrypted client key 604 from at least one client device 108. For example, once the hardware security module 105 has validated the endorsement messages and confirmed that the quorum is satisfied, the online server computer 102 may request a client device 108 to transmit the encrypted client key 604 to the server computer 102. In some embodiments, the encrypted client key 604 is included within a signed message endorsing the cryptoasset transaction. In some implementations, until the quorum is met, the encrypted client key 604 cannot be used by the hardware security module 105. Thus, a malicious entity that manages to hack into a client device 108 and present the encrypted client key 604 to the hardware security module 105 will not gain access to the cryptoasset because the quorum is not met.

In some embodiments, prior to transmitting the encrypted client key 604 to the cryptoasset custodial system 100, the encrypted client key 604 is received by the client device 108 from an offline secure enclave 114 using an offline channel. Such an offline channel is described in more detail with reference to FIG. 5. The offline channel couples the offline secure enclave 114 to the client device 108. As noted with reference to FIG. 5, the offline channel is a channel that is not accessible via the Internet. The offline channel can be, for example, a local visual display by an online client device, a sound or sequence of sounds generated by an online client device, or a short range wireless transmission from an online client device (e.g., via Bluetooth). An offline client device 108 or secure enclave 114 receives a request for the encrypted client key 604 from the online client device via the offline channel, and based on the request thereby received, sends the encrypted client key 604 to the online client device via the same offline channel by which it received the request, or via a different offline channel. Thus even if a malicious entity manages to access the online client device, he or she cannot gain access to the offline secure enclave 114.

The hardware security module 105 decrypts the encrypted client key 604 to generate the client key 608. The decrypting is performed using the hardware-based cryptographic key of the hardware security module 105. Thus, the decrypting involves the hardware security module 105 using its hardware-based cryptographic key to reveal the decrypted key 608. The fully decrypted client key 608 is only available inside the hardware security module 105 itself In some implementations, the hardware security module 105 derives a cryptoasset key from the client key 608. The cryptoasset key references a cryptoasset recorded in the blockchain 111. For example, the cryptoasset key can denote the type of cryptoasset, an address of the cryptoasset on the blockchain 111, or a node of the blockchain 111 containing the latest record of cryptoasset transactions involving the cryptoasset. In some embodiments, a KDF algorithm can be used to derive the cryptoasset key, for example, to create a new cryptoasset key for a migration of cryptoassets, from the client key 608, as a security measure. In the unlikely event of compromise of the hardware security module 105, the cryptoassets protected by the cryptoasset key would be moved to new cryptoasset keys.

The hardware security module 105 signs an approval message 616 for the cryptoasset transaction using the cryptoasset key accessed using, or derived from, the client key 608 to produce a digitally signed approval message 616. The cryptoasset key references the cryptoasset recorded in the blockchain 111. The online server computer 102 forwards the digitally signed approval message 616 to the blockchain 111. In some embodiments, the hardware security module 105 signs a blockchain address with the cryptoasset key and returns the signed blockchain address to the online server computer 102. The online server computer 102 causes the signed blockchain address to be sent to the client device 108, to cause the client device 108 to present the address to a representative, in an easy-to-consume format (e.g., as a QR code), for use as a destination address in a blockchain transaction.

Figure 7:
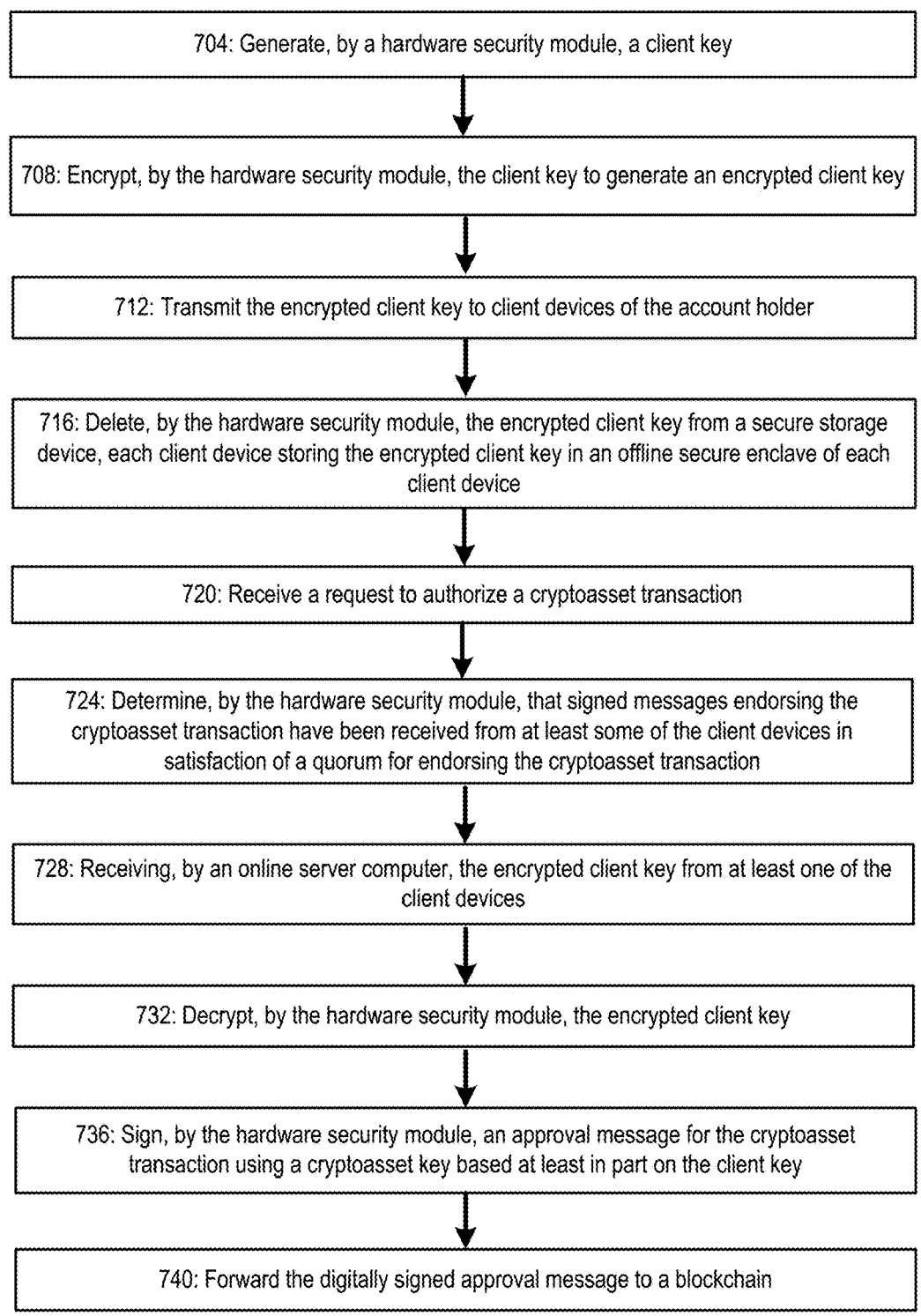
FIG. 7 illustrates a process for operation of a cryptoasset custodial system using encrypted and distributed client keys.

FIG. 7 illustrates a process 700 for a cryptoasset custodial system 100 using encrypted client keys 604. The cryptoasset custodial system 100 is illustrated and described in more detail with reference to FIG. 1. In some embodiments, the process 700 of FIG. 7 is performed by the cryptoasset custodial system 100. In other embodiments, other entities, for example, a client device 108, performs some or all of the steps of the process 700. The client device 108 is illustrated and described in more detail with reference to FIG. 1. Likewise, embodiments may include different and/or additional steps, or perform the steps in different orders.

The cryptoasset custodial system 100 uses a hardware security module 105 to generate 704 a new client key 608 for an account holder of the cryptoasset custodial system 100. The hardware security module 105 is illustrated and described in more detail with reference to FIGS. 1 and 6. The client key 608 is an account-holder-specific, asset-agnostic, cryptographic key. In some implementations, the cryptoasset custodial system 100 can use the client key 608, or a cryptoasset key derived from the client key 608, to authorize a cryptoasset transaction. The client key 608 can sometimes be referred to as a "client seed" or a "master seed."

The cryptoasset custodial system 100 uses the hardware security module 105 to encrypt 708 the client key 608 to generate an encrypted client key 604. The encryption is performed using a hardware-based cryptographic key within a secure storage device 107 of the hardware security module 105. The secure storage device 107 is illustrated and described in more detail with reference to FIGS. 1 and 6.

The cryptoasset custodial system 100 uses an online server computer 102 to transmit 712 the encrypted client key 604 to the client devices 108 of the account holder. The online server computer 102 is communicably coupled to the hardware security module 105 via a relay server 103. The server computer 102 is illustrated and described in more detail with reference to FIG. 1. More than one, e.g., each, client device 108 stores a copy of the encrypted client key 604, e.g., in an offline secure enclave 114. In some implementations, the copies of the encrypted client key 604 are exclusively stored on the client devices 108 and not on a cloud or the hardware security module 105. Thus the encrypted client key 604 is stored in a distributed manner. The embodiments disclosed herein provide security advantages since a malicious entity must compromise both a client device 108 as well as the hardware security module 105 to gain access to the client key 608. Moreover, the copies of the encrypted client key 604 stored on the different client devices 108 provide redundancy and security advantages (encrypted client keys 604 are inherently backed up on multiple client devices 108).

In some implementations, the cryptoasset custodial system 100 uses the hardware security module 105 to delete 716 the encrypted client key 604 from the secure storage device 107. The hardware security module 105 deletes the encrypted client key 604 from the secure storage device 107 once it has generated and sent the encrypted client key 604 to the client devices 108 of authorized representatives of the account holder. Thus, in some implementations, the copies of the encrypted client key 604 are stored in a distributed manner only on the client devices 108 and not on the hardware security module 105. The hardware security module 105 is the only entity capable of decrypting the encrypted client key 604. However, the hardware security module 105 does not possess the encrypted client key 604. Therefore, a malicious entity that manages to hack in to the hardware security module 105 would not have access to, and would not be able to gain access to, the client key 608. Client devices 108 store the encrypted client key 604. However, the client device 108 itself is unable to decrypt the encrypted client key 604 because the client device 108 does not possess the hardware-based cryptographic key of the hardware security module 105. Thus a malicious entity that manages to hack into the client device 108 to access the encrypted client key 604 would not be able to decrypt the encrypted client key 604. Thus the encrypted client key 604 is stored in a secure, distributed, and redundant manner.

The cryptoasset custodial system 100 receives 720 a request to authorize a cryptoasset transaction. In response to receipt of the request to authorize the cryptoasset transaction, the cryptoasset custodial system 100 causes an endorsement request message to be sent to client devices 108, each of which is associated with a different representative of the account holder who has been defined as a potential member of a quorum for transactions involving that cryptoasset (in other embodiments, multiple representatives can share the same client device 108). The endorsement request message is configured to cause each receiving client device 108 to prompt a representative to provide an endorsement of the requested transaction. An endorsement in this context is an approval or rejection of an operation (e.g., a transaction) by a client device 108.

The cryptoasset custodial system 100 uses the hardware security module 105 to determine 724 that signed messages endorsing the cryptoasset transaction have been received from at least some of the client devices 108 in satisfaction of a quorum for endorsing the cryptoasset transaction. Thus, even if a malicious entity manages to hack into a single client device 108, the malicious entity will not be able to satisfy the quorum using that single client device alone. In some embodiments, the hardware security module 105 determines that the signed messages have been received in satisfaction of the quorum by verifying a policy map specifying the client devices 108 and a threshold number of the client devices 108 required to endorse the cryptographic transaction. For example, the threshold can be 7 devices, 30% of the devices, or 70% of the devices.

The cryptoasset custodial system 100 uses the online server computer 102 to receive 728 the encrypted client key 604 from at least one client device 108. For example, once the hardware security module 105 has validated the endorsement messages and confirmed that the quorum is satisfied, the online server computer 102 may request a client device 108 to transmit the encrypted client key 604 to the server computer 102. In some embodiments, the encrypted client key 604 is included within a signed message endorsing the cryptoasset transaction.

The cryptoasset custodial system 100 uses the hardware security module 105 to decrypt 732 the encrypted client key 604 to generate the client key 608. The decrypting is performed using the hardware-based cryptographic key of the hardware security module 105.

The cryptoasset custodial system 100 uses the hardware security module 105 to sign 736 an approval message 616 for the cryptoasset transaction using a cryptoasset key to produce a digitally signed approval message 616. The cryptoasset key can be based at least in part on the client key 608. For example, the hardware security module 105 signs a withdrawal transaction with the private key of a blockchain address. The online server computer 102 submits the transaction onto the blockchain 111 to execute the withdrawal.

The cryptoasset custodial system 100 uses the online server computer 102 to forward 740 the digitally signed approval message 616 to a blockchain 111. The blockchain 111 is illustrated and described in more detail with reference to FIGS. 1 and 6. The address of the cryptoasset transaction (e.g., deposit) is stored in a collection with other addresses belonging to the account holder in the cryptoasset custodial system 100, known as the customer's "vault." A vault in this context is a data entity that contains assets and a policy map containing one or more policies governing deposits and withdrawals from those assets. A cryptoasset is represented as a slot inside a vault that can hold an amount of an asset type (e.g., Bitcoin, Ethereum). Once under custody and stored with the cryptoasset custodial system 100, an asset is completely under the control of the cryptoasset custodial system 100.

Figure 8:
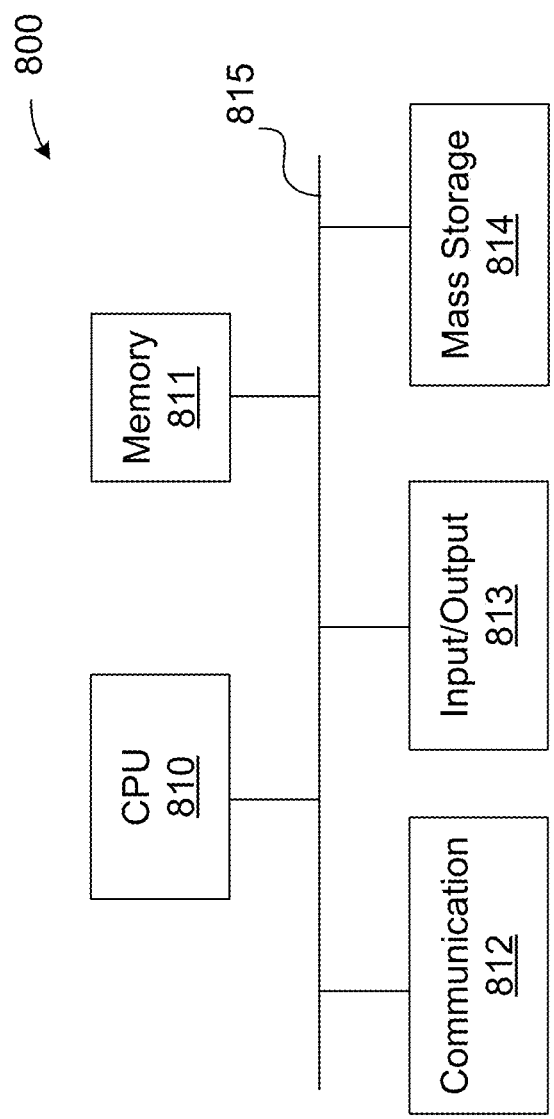
FIG. 8 is a high-level block diagram showing an example of a hardware architecture of a processing system that can be used to implement some or all of the cryptoasset custodial system or a client device.

FIG. 8 is a high-level block diagram showing an example of a hardware architecture of a processing system 800 that can be used to implement some or all of the cryptoasset custodial system 100 or a client device 108. The cryptoasset custodial system 100 can include one or more instances of an architecture such as shown in FIG. 8, where multiple such instances can be coupled to each other via one or more private networks.

The illustrated processing system 800 includes one or more processors, including a CPU 810, one or more memories 811 (at least a portion of which may be used as working memory, e.g., random access memory (RAM)), one or more data communication device(s) 812, one or more input/output (I/O) devices 813, and one or more mass storage devices 814, all coupled to each other through an interconnect 815. The interconnect 815 may be or include one or more conductive traces, buses, point-to-point connections, controllers, adapters and/or other conventional connection devices. Each processor 810 controls part of the operation of the processing device 800 and can be or include, for example, one or more general-purpose programmable microprocessors, digital signal processors (DSPs), mobile application processors, microcontrollers, application specific integrated circuits (ASICs), programmable gate arrays (PGAs), or the like, or a combination of such devices.

Each memory 811 can be or include one or more physical storage devices, which may be in the form of RAM, read-only memory (ROM) (which may be erasable and programmable), flash memory, miniature hard disk drive, or other suitable type of storage device, or a combination of such devices. Each mass storage device 814 can be or include one or more hard drives, digital versatile disks (DVDs), flash memories, or the like. Each memory 811 and/or mass storage 814 can store (individually or collectively) data and instructions that configure the processor(s) 810 to execute operations to implement the techniques described above. Each communication device 812 may be or include, for example, an Ethernet adapter, cable modem, Wi-Fi adapter, cellular transceiver, baseband processor, Bluetooth or Bluetooth Low Energy (BLE) transceiver, or the like, or a combination thereof. Depending on the specific nature and purpose of the processing system 800, each I/O device 813 can be or include a device such as a display (which may include a transparent AR display surface), audio speaker, keyboard, mouse or other pointing device, microphone, camera, etc. Note, however, that such I/O devices may be unnecessary if the processing device 800 is embodied solely as a server computer.

In the case of a client device, a communication device 812 can be or include, for example, a cellular telecommunications transceiver (e.g., 3G, LTE/4G, 5G), Wi-Fi transceiver, baseband processor, Bluetooth or BLE transceiver, or the like, or a combination thereof. In the case of a server, a communication device 812 can be or include, for example, any of the aforementioned types of communication devices, a wired Ethernet adapter, cable modem, DSL modem, or the like, or a combination of such devices.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose ("hardwired") circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., RAM or ROM; magnetic disk storage media; optical storage media; flash memory devices; etc.), etc.

The term "logic", as used herein, means: i) special-purpose hardwired circuitry, such as one or more application-specific integrated circuits (ASICs), programmable logic devices (PLDs), field programmable gate arrays (FPGAs), or other similar device(s); ii) programmable circuitry programmed with software and/or firmware, such as one or more programmed general-purpose microprocessors, digital signal processors (DSPs) and/or microcontrollers, system-on-a-chip systems (SOCs), or other similar device(s); or iii) a combination of the forms mentioned in i) and ii).

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
    generating, by a hardware security module of a cryptoasset custodial system, a client key for an account holder of the cryptoasset custodial system;
    encrypting, by the hardware security module, the client key to generate an encrypted client key using a hardware-based cryptographic key within a secure storage device of the hardware security module;
    transmitting, by an online server computer of the cryptoasset custodial system, the encrypted client key to a plurality of client devices of authorized representatives of the account holder, the online server computer communicably coupled to the hardware security module;
    responsive to the transmitting of the encrypted client key, deleting, by the hardware security module, the encrypted client key from the secure storage device;
    receiving, by the online server computer of the cryptoasset custodial system, a request to authorize a cryptoasset transaction;
    determining, by the hardware security module, that a plurality of signed messages endorsing the cryptoasset transaction has been received from at least some of the plurality of client devices of the authorized representatives in satisfaction of a quorum for endorsing the cryptoasset transaction;
    receiving, by the online server computer, the encrypted client key from at least one of the plurality of client devices;
    decrypting, by the hardware security module, the encrypted client key to generate the client key, the decrypting performed using the hardware-based cryptographic key of the hardware security module, the hardware-based cryptographic key being an in-hardware master key of the hardware security module;
    deriving, by the hardware security module, a cryptoasset key based at least in part on the decrypted client key;

signing, by the hardware security module, an approval message for the cryptoasset transaction using the cryptoasset key derived based at least in part on the decrypted client key to produce a digitally signed approval message; and forwarding, by the online server computer, the digitally signed approval message to a blockchain.

2. The method of claim 1, wherein the cryptoasset key references a cryptoasset recorded in the blockchain.

3. The method of claim 1, wherein the client key produces a random digital signature.

4. The method of claim 1, wherein the encrypted client key is included within the plurality of signed messages endorsing the cryptoasset transaction.

5. The method of claim 1, wherein, upon transmitting, by the online server computer of the cryptoasset custodial system, the encrypted client key to a plurality of client devices of the authorized representatives of the account holder, each of the plurality of client devices transmits the encrypted client key to a corresponding offline secure enclave via an offline channel.

6. The method of claim 1, wherein, prior to receiving, by the online server computer, the encrypted client key from at least one of the plurality of client devices, the at least one of the plurality of client devices receives the encrypted client key from a corresponding offline secure enclave via an offline channel.

7. The method of claim 1, wherein the determining that the plurality of signed messages has been received in satisfaction of the quorum comprises:

verifying, by the hardware security module, a policy map specifying the plurality of client devices and a threshold number of the plurality of client devices to endorse the cryptographic transaction;

validating, by the hardware security module, messages from the at least some of the plurality of client devices by checking cryptographic digital signatures using public keys corresponding to the at least some of the plurality of client devices; and confirming, by the hardware security module, that the messages are in accordance with control rules of the policy map after the messages have been validated for the threshold number of the specified plurality of client devices.

8. A non-transitory computer-readable storage medium storing instructions executable by one or more computer processors, the instructions when executed by the one or more computer processors cause the one or more computer processors to:

generate, by a hardware security module of a cryptoasset custodial system, a client key for an account holder of the cryptoasset custodial system;

encrypt, by the hardware security module, the client key to generate an encrypted client key using a hardware-based cryptographic key within a secure storage device of the hardware security module;

transmit, by an online server computer of the cryptoasset custodial system, the encrypted client key to a plurality of client devices of authorized representatives of the account holder, the online server computer communicably coupled to the hardware security module;

responsive to the transmitting of the encrypted client key, delete, by the hardware security module, the encrypted client key from the secure storage device;

receive, by the online server computer of the cryptoasset custodial system, a request to authorize a cryptoasset transaction;

determine, by the hardware security module, that a plurality of signed messages endorsing the cryptoasset transaction has been received from at least some of the plurality of client devices of the authorized representatives in satisfaction of a quorum for endorsing the cryptoasset transaction;

receive, by the online server computer, the encrypted client key from at least one of the plurality of client devices;

decrypt, by the hardware security module, the encrypted client key to generate the client key, the decrypting performed using the hardware-based cryptographic key of the hardware security module, the hardware-based cryptographic key being an in-hardware master key of the hardware security module;

derive, by the hardware security module, a cryptoasset key based at least in part on the decrypted client key;

sign, by the hardware security module, an approval message for the cryptoasset transaction using the cryptoasset key derived based at least in part on the decrypted client key to produce a digitally signed approval message; and forward, by the online server computer, the digitally signed approval message to a blockchain.

9. The non-transitory computer-readable storage medium of claim 8, wherein the cryptoasset key references a cryptoasset recorded in the blockchain.

10. The non-transitory computer-readable storage medium of claim 8, wherein the client key produces a random digital signature.

11. The non-transitory computer-readable storage medium of claim 8, wherein the encrypted client key is included within the plurality of signed messages endorsing the cryptoasset transaction.

12. The non-transitory computer-readable storage medium of claim 8, wherein, upon transmitting, by the online server computer of the cryptoasset custodial system, the encrypted client key to a plurality of client devices of the authorized representatives of the account holder, each of the plurality of client devices transmits the encrypted client key to a corresponding offline secure enclave via an offline channel.

13. The non-transitory computer-readable storage medium of claim 8, wherein, prior to receiving, by the online server computer, the encrypted client key from at least one of the plurality of client devices, the at least one of the plurality of client devices receives the encrypted client key from a corresponding offline secure enclave via an offline channel.

14. The non-transitory computer-readable storage medium of claim 8, wherein the determining that the plurality of signed messages has been received in satisfaction of the quorum comprises:

verifying, by the hardware security module, a policy map specifying the plurality of client devices and a threshold number of the plurality of client devices to endorse the cryptographic transaction;

validating, by the hardware security module, messages from the at least some of the plurality of client devices by checking cryptographic digital signatures using public keys corresponding to the at least some of the plurality of client devices; and confirming, by the hardware security module, that the messages are in accordance with control rules of the policy map after the messages have been validated for the threshold number of the specified plurality of client devices.

15. A cryptoasset custodial system comprising:
one or more computer processors; and
a non-transitory computer-readable storage medium storing instructions executable by the one or more computer processors, the instructions when executed by the one or more computer processors cause the one or more computer processors to:
- generate, by a hardware security module of the cryptoasset custodial system, a client key for an account holder of the cryptoasset custodial system;
- encrypt, by the hardware security module, the client key to generate an encrypted client key using a hardware-based cryptographic key within a secure storage device of the hardware security module;
- transmit, by an online server computer of the cryptoasset custodial system, the encrypted client key to a plurality of client devices of the authorized representatives of the account holder, the online server computer communicably coupled to the hardware security module;
- responsive to the transmitting of the encrypted client key, delete, by the hardware security module, the encrypted client key from the secure storage device;
- receive, by the online server computer of the cryptoasset custodial system, a request to authorize a cryptoasset transaction;
- determine, by the hardware security module, that a plurality of signed messages endorsing the cryptoasset transaction has been received from at least some of the plurality of client devices of the authorized representatives in satisfaction of a quorum for endorsing the cryptoasset transaction;
- receive, by the online server computer, the encrypted client key from at least one of the plurality of client devices;
- decrypt, by the hardware security module, the encrypted client key to generate the client key, the decrypting performed using the hardware-based cryptographic key of the hardware security module, the hardware-based cryptographic key being an in-hardware master key of the hardware security module;
- derive, by the hardware security module, a cryptoasset key based at least in part on the decrypted client key;
- sign, by the hardware security module, an approval message for the cryptoasset transaction using the cryptoasset key derived based at least in part on the decrypted client key to produce a digitally signed approval message; and
- forward, by the online server computer, the digitally signed approval message to a blockchain.

16. The cryptoasset custodial system of claim 15, wherein the cryptoasset key references a cryptoasset recorded in the blockchain.

17. The cryptoasset custodial system of claim 15, wherein the client key produces a random digital signature.

18. The cryptoasset custodial system of claim 15, wherein the encrypted client key is included within the plurality of signed messages endorsing the cryptoasset transaction.

19. The cryptoasset custodial system of claim 15, wherein, upon transmitting, by the online server computer of the cryptoasset custodial system, the encrypted client key to a plurality of client devices of the authorized representatives of the account holder, each of the plurality of client devices transmits the encrypted client key to a corresponding offline secure enclave via an offline channel.

20. The cryptoasset custodial system of claim 15, wherein, prior to receiving, by the online server computer, the encrypted client key from at least one of the plurality of client devices, the at least one of the plurality of client devices receives the encrypted client key from a corresponding offline secure enclave via an offline channel.

* * * * *